(12) United States Patent
Ishihara

(10) Patent No.: US 10,449,881 B2
(45) Date of Patent: Oct. 22, 2019

(54) HEAD REST

(71) Applicant: TS TECH CO., LTD., Asaka-shi, Saitama (JP)

(72) Inventor: Kazunori Ishihara, Shioya-gun (JP)

(73) Assignee: TS TECH CO., LTD., Asaka (JP)

( * ) Notice: Subject to any disclaimer, the term of this patent is extended or adjusted under 35 U.S.C. 154(b) by 141 days.

(21) Appl. No.: 15/701,931

(22) Filed: Sep. 12, 2017

(65) Prior Publication Data

US 2018/0001803 A1 Jan. 4, 2018

Related U.S. Application Data

(63) Continuation of application No. 14/430,689, filed as application No. PCT/JP2012/074712 on Sep. 26, 2012, now Pat. No. 9,789,795.

(51) Int. Cl.

| B60N 2/865 | (2018.01) |
|---|---|
| B60N 2/829 | (2018.01) |
| B60N 2/862 | (2018.01) |
| B60N 2/815 | (2018.01) |
| B60N 2/818 | (2018.01) |
| B60N 2/894 | (2018.01) |

(52) U.S. Cl.
CPC .............. B60N 2/865 (2018.02); B60N 2/815 (2018.02); B60N 2/818 (2018.02); B60N 2/829 (2018.02); B60N 2/862 (2018.02); B60N 2/894 (2018.02)

(58) Field of Classification Search
CPC ....................................................... B60N 2/865
See application file for complete search history.

(56) References Cited

U.S. PATENT DOCUMENTS

| 4,674,797 A | 6/1987 | Tateyama |
| 4,733,913 A | 3/1988 | Tateyama |
| 4,762,367 A | 8/1988 | Denton |
| 5,020,855 A | 6/1991 | Lindberg et al. |

(Continued)

FOREIGN PATENT DOCUMENTS

| CN | 1576110 A | 2/2005 |
| CN | 200977879 Y | 11/2007 |

(Continued)

OTHER PUBLICATIONS

Sep. 22, 2017 Search Report issued in European Patent Office Application No. 17170385.3.

(Continued)

*Primary Examiner* — David R Dunn
*Assistant Examiner* — Tania Abraham
(74) *Attorney, Agent, or Firm* — Oliff PLC

(57) ABSTRACT

A headrest is provided including a movable unit that can be shifted to multiple positions in the front-rear direction in a normal mode. A headrest includes first and second headrest pillars, a stationary unit disposed between the first and second headrest pillars, a movable unit movable apart from or close to the stationary unit toward a front or rear direction, an X linkage connecting the stationary unit to the movable unit and including an inside linkage segment and an outside linkage segment rotatably connected each other at a central connecting intersection, and a front-rear locking mechanism including a lock receiver and a locking component engageable with the lock receiver, to lock or unlock the movable unit movable relative to the stationary unit toward the front or rear direction.

10 Claims, 14 Drawing Sheets

(56) References Cited

U.S. PATENT DOCUMENTS

| | | |
|---|---|---|
| 6,082,817 A | 7/2000 | Muller |
| 6,688,697 B2 | 2/2004 | Baumann et al. |
| 7,284,793 B2 | 10/2007 | Kluhspies et al. |
| 7,455,363 B2 | 11/2008 | Chung |
| 7,517,015 B2 | 4/2009 | Terada et al. |
| 7,611,196 B2 | 11/2009 | Terada et al. |
| 7,618,091 B2 | 11/2009 | Akaike et al. |
| 7,717,507 B2 | 5/2010 | Toda et al. |
| 7,766,423 B2 | 8/2010 | Alexander et al. |
| 7,770,967 B2 | 8/2010 | Hirota et al. |
| 8,038,219 B2 | 10/2011 | Boes et al. |
| 8,596,715 B2 | 12/2013 | Yamaguchi et al. |
| 8,616,633 B2 | 12/2013 | Truckenbrodt et al. |
| 8,936,310 B2 | 1/2015 | Takayama et al. |

FOREIGN PATENT DOCUMENTS

| | | | |
|---|---|---|---|
| CN | 101665091 A | | 3/2010 |
| CN | 101712290 A | | 5/2010 |
| CN | 101898527 A | | 12/2010 |
| CN | 201798309 U | | 4/2011 |
| DE | 102005059693 A1 | | 11/2006 |
| DE | 102006035352 A1 | | 4/2007 |
| DE | 102011009659 A1 | | 3/2012 |
| EP | 1584514 A2 | | 10/2005 |
| JP | S59-174055 U | | 11/1984 |
| JP | H05-058464 U | | 8/1993 |
| JP | 2005-087650 A | | 4/2005 |
| JP | 4280589 B2 | | 6/2009 |
| JP | 4607070 B2 | | 1/2011 |

OTHER PUBLICATIONS

Nov. 6, 2012 Search Report issued in International Application No. PCT/JP2012/074712.

Mar. 31, 2015 International Preliminary Report of Patentability issued in International Application No. PCT/JP2012/074712.

May 6, 2016 Extended Search Report issued in European Patent Application No. 12885849.5.

May 17, 2016 Office Action issued in Japanese Patent Application No. 2014537901.

Jun. 27, 2016 Office Action issued in Chinese Patent Application No. 201280076065.3.

Mar. 20, 2017 Office Action issued in Chinese Patent Application No. 201280076065.3.

Aug. 20, 2018 Search Report Issued in European Patent Application No. 18169346.6.

HEAD REST

This application is a continuation application of U.S. patent application Ser. No. 14/430,689, filed Mar. 24, 2015, which is a national stage application of PCT/JP2012/074712, filed Sep. 26, 2012. The disclosures of each of the above applications are hereby incorporated by reference in their entireties.

TECHNICAL FIELD

The present invention relates to a headrest to be mounted to a vehicle seat.

BACKGROUND ART

Headrests of vehicle seats improve the seating comfort and the safety through the support of heads of occupants upon a vehicle collision.

Patent Literature 1 discloses a headrest including a rear section fixed to headrest pillars, and a front section that is connected to the rear section with a pair of X linkage segments of a linkage and moves apart from the rear section upon a rear-end collision. The movement of the front section of the headrest apart from the rear section is caused by an unlocking operation of a solenoid in response to the rear-end collision.

Such a headrest, which includes the X linkage segments functioning as diagonal supports, has sufficient strength against the stress of a head pushing back the front section of the headrest.

CITATION LIST

Patent Literature

Patent Literature 1: Japanese Patent No. 4280589

SUMMARY OF INVENTION

Technical Problem

A headrest should be disposed at a proper position relative to the head of an occupant to provide sufficient comfort. Unfortunately, the front section (hereinafter referred to as "movable unit") of the headrest disclosed in PTL 1 can move only upon a rear-end collision, and cannot be shifted to a desired position in the front-rear direction in a normal mode.

An object of the invention is to provide a headrest including a movable unit that can be shifted to multiple positions in the front-rear direction in a normal mode.

Solution to Problem

To solve the problem, a headrest according to an embodiment includes, first and second headrest pillars, a stationary unit disposed between the first and second headrest pillars, a movable unit movable apart from or close to the stationary unit toward a front or rear direction, an X linkage connecting the stationary unit to the movable unit, the X linkage including an inside linkage segment and an outside linkage segment rotatably connected each other at a central connecting intersection and a front-rear locking mechanism comprising at least one lock receiver and at least one lock engageable with the lock receiver, the locking mechanism being configured to lock or unlock the movable unit movable relative to the stationary unit toward the front or rear direction.

An embodiment includes a configuration wherein the outside linkage segment and the lock receiver are integrated with each other.

An embodiment includes a configuration wherein the inside linkage segment and the lock receiver are integrated with each other.

An embodiment includes a configuration wherein the lock receiver includes a ratchet mechanism having a plurality of teeth arranged on an arc line corresponding to rotation of the X linkage.

An embodiment includes a configuration wherein the lock receiver is disposed in the center between the first and second headrest pillars.

An embodiment includes a configuration wherein the lock receiver is disposed in a right or left portion relative to the center between the first and second headrest pillars.

An embodiment includes a configuration wherein the at least one lock receiver includes a plurality of lock receivers disposed in right and left portions relative to the center between the first and second headrest pillars.

An embodiment includes a configuration wherein the lock receivers are disposed in right and left spaces, the right and left spaces being defined by the stationary unit and the X linkage in a width direction of the headrest.

An embodiment includes a configuration further including an operation unit to operate the at least one locking component, wherein the at least one locking component includes a plurality of locking components corresponding to the lock receivers, and the operation unit simultaneously operates the locking components.

An embodiment includes a configuration further including an operation unit to operate the at least one locking component, wherein the at least one locking component includes a plurality of locking components corresponding to the lock receivers, the locking components being coupled to each other with a coupler such that the locking components move in synchronization.

An embodiment includes a configuration wherein the at least one lock receiver protrudes rearward from the stationary unit in response to the movement of the movable unit toward the rear direction, and the stationary unit has at least one clearance to receive the at least one lock receiver.

Advantageous Effects of Invention

According to an embodiment, the X linkage allows the movable unit to move apart from or close to the stationary unit toward the front or rear direction. The headrest thus can provide high seating comfort.

According to an embodiment, the lock receiver integrated with the outside linkage segment can rotate in conjunction with the outside linkage segment. In other words, the X linkage and the front-rear locking mechanism can move together. The movable unit can thus be readily shifted adjustably in the front-rear direction.

According to an embodiment, the lock receiver integrated with the inside linkage segment can rotate in conjunction with the inside linkage segment. In other words, the X linkage and the front-rear locking mechanism can move together. The movable unit can thus be readily shifted adjustably in the front-rear direction.

According to an embodiment, the lock receiver includes a ratchet mechanism having multiple teeth; hence, the movable unit can be shifted adjustably to multiple positions corresponding to the respective teeth in the front-rear direction. In addition, the teeth of the lock receiver are arranged on an arc line corresponding to the rotation of the X linkage, so that the front-rear movement of the movable unit by the X linkage can be readily associated with the locking or unlocking of the movable unit by the front-rear locking mechanism.

According to an embodiment, the front-rear locking mechanism, which includes the lock receiver disposed in the center between the first and second headrest pillars, can achieve a balanced locking or unlocking operation in the center in the width direction of the headrest. In addition, the X linkage disposed symmetrically to the lock receiver can rotate smoothly.

According to an embodiment, the lock receiver is disposed in the right or left portion relative to the center between the first and second headrest pillars. In other words, the position of the lock receiver is deviated from the center to one side. The X linkage thus can have an increased width corresponding to the deviated length of the lock receiver.

According to an embodiment, the front-rear locking mechanism, which includes the multiple lock receivers disposed in the right and left portions relative to the center between the first and second headrest pillars, can achieve a balanced locking or unlocking operation over multiple positions in the width direction of the headrest. Furthermore, the X linkage disposed between the lock receivers can be centered and rotate smoothly.

According to an embodiment, the front-rear locking mechanism, which includes the lock receivers disposed in the right and left spaces defined by the stationary unit and the X linkage in the width direction of the headrest, can achieve a balanced locking or unlocking operation over multiple positions in the width direction. In addition, the X linkage disposed between the lock receivers can be centered and rotate smoothly.

Furthermore, the lock receivers are disposed in the spaces defined by the stationary unit and the X linkage and thus this configuration facilitates producing of a compact headrest since the lock receivers can be readily accommodated in the compact headrest without blocking the producing.

According to an embodiment, the connecting intersection simultaneously operates the locking components and thus can simultaneously disengage the locking components from the lock receivers. In other words, the operation unit can efficiently unlock the multiple separate locking mechanisms in the right and left portions relative to the center between the first and second headrest pillars through a single operation.

According to an embodiment, the locking components are coupled to each other with the coupler such that the locking components move in synchronization; hence, an operation of the operation unit on one of the locking components can simultaneously disengage all the locking components from the lock receivers. In other words, the operation unit can efficiently unlock the multiple separate locking mechanisms in the right and left portions relative to the center between the first and second headrest pillars through a single operation.

According to an embodiment, the lock receiver(s) can protrude rearward from the stationary unit through the clearance(s) of the stationary unit for receiving the lock receiver(s), in response to the rearward movement of the movable unit. This configuration can prevent the stationary unit from blocking the rotation of the lock receiver(s) for protruding rearward from the stationary unit.

DESCRIPTION OF EMBODIMENTS

Figure 1:
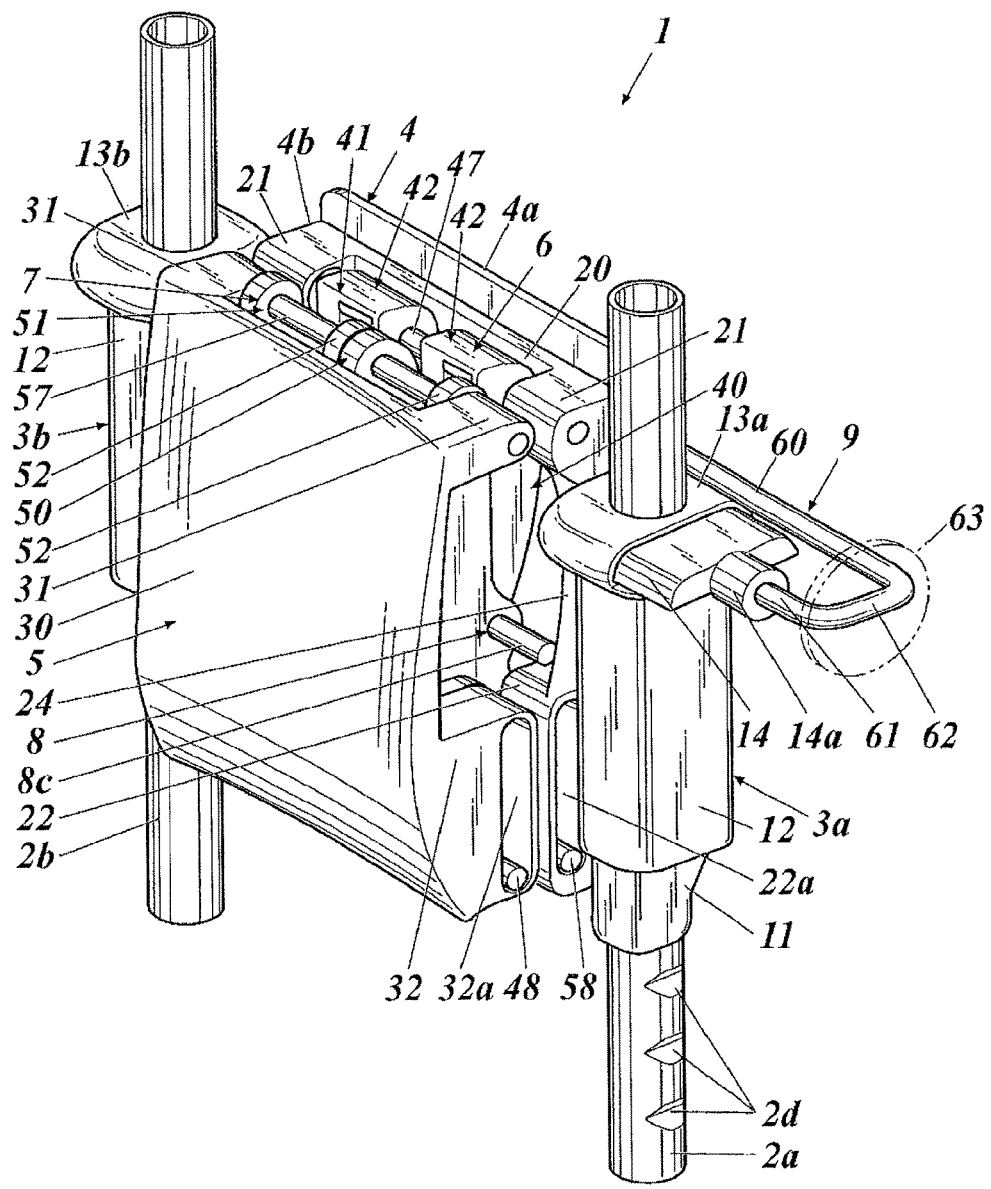
FIG. 1 is a front perspective view of a headrest before movement.

Embodiments of the invention will now be described with reference to the accompanying drawings.

With reference to FIGS. 1 to 11, a headrest 1 according to an embodiment includes first and second headrest pillars 2a and 2b, a pair of pillar retainers 3a and 3b, a stationary unit 4, a movable unit 5, a moving mechanism, a front-rear locking mechanism, a vertical locking mechanism, and a operation unit 9. The headrest 1 also includes a headrest casing 33 that can house the upper portions of the first and second headrest pillars 2a and 2b and the other components, and a cushion pad and a covering material disposed around the headrest casing 33.

The headrest 1 is mounted to the top end of a seat back 10 of a vehicle seat.

The front, rear, upper, lower, right, and left directions in the embodiment are identical to those of the vehicle seat and the vehicle.

The first and second headrest pillars 2a and 2b extend downward from the headrest 1 and are mounted to a seat back frame 10a of the seat back 10. In other words, the headrest 1 is mounted to the seat back frame 10a via the first and second headrest pillars 2a and 2b.

The first and second headrest pillars 2a and 2b have the same diameter. At least one of the first and second headrest pillars 2a and 2b has multiple notches 2c, which function as the vertical locking mechanism, spaced in the longitudinal direction.

The pillar retainers 3a and 3b respectively hold the first and second headrest pillars 2a and 2b, and are vertically slidable along the first and second headrest pillars 2a and 2b.

The pillar retainers 3a and 3b each include a cylindrical base 11 to hold the first or second headrest pillar 2a or 2b, a cover 12 surrounding the cylindrical base 11, and a head 13a or 13b disposed on the top end of the cylindrical base 11.

The cylindrical bases 11 each have a through hole extending in the longitudinal direction to receive the first or second headrest pillar 2a or 2b.

The covers 12 are each fabricated by bending a metal plate into a rectangular tube, and hold the cylindrical base 11.

The heads 13a and 13b are integrated with the top ends of the respective cylindrical bases 11. The heads 13a and 13b each have a central opening in communication with the through hole of the cylindrical base 11. The head 13a, which is provided to the first headrest pillar 2a of the first and second headrest pillars 2a and 2b, is equipped with a locking unit 14 that functions as the vertical locking mechanism (described below).

The fixed unit 4 is disposed between the first and second headrest pillars 2a and 2b and is disposed over the seat back frame 10a with the first and second headrest pillars 2a and 2b.

The stationary unit 4 is vertically slidable along the first and second headrest pillars 2a and 2b.

The movable unit 5 is connected to the stationary unit 4 with the moving mechanism, and can move apart from or close to the stationary unit 4 toward the front or rear direction.

The moving mechanism connects the stationary unit 4 to the movable unit 5. Examples of the moving mechanism include a linkage. In particular, an X linkage is used in the embodiment. The X linkage includes an inside linkage segment 6 and an outside linkage segment 7 rotatably connected each other at a central connecting intersection 8.

The front-rear locking mechanism includes a lock receiver 15 and a locking component 16 engageable with the lock receiver 15, to lock or unlock the movable unit 5 movable forward or rearward relative to the stationary unit 4.

The vertical locking mechanism engages or disengages the stationary unit 4 with or from the first and second headrest pillars 2a and 2b at multiple vertical positions. The vertical locking mechanism includes the locking unit 14, as described above.

The operation unit 9 operates the front-rear locking mechanism and the vertical locking mechanism in the same direction and simultaneously. In specific, the operation unit 9 unlocks the movable unit 5 prevented from moving in the front-rear direction and also unlocks the stationary unit 4 prevented from moving in the vertical direction.

The operation direction of the operation unit 9 is set so as to be along the right-left direction. Although the operation unit 9 can be operated manually or automatically, it is operated manually in the embodiment.

The X linkage will now be described in more detail. The following description focuses on the detailed configurations of the stationary unit 4 and the movable unit 5.

With reference to FIGS. 1 to 6 and 8 to 11, the stationary unit 4 includes a plate-like base 4a fixed to the first and second headrest pillars 2a and 2b, and a body 4b disposed on the front surface of the base 4a and connected to the X linkage.

The base 4a is composed of a metal and has a substantially inverted T shape as viewed from the back.

The right and left portions of the substantially inverted T plate are fixed to the rear surfaces of the covers 12 of the pillar retainers 3a and 3b, respectively. The central portion of the substantially inverted T plate is fixed to the body 4b.

Figure 2:
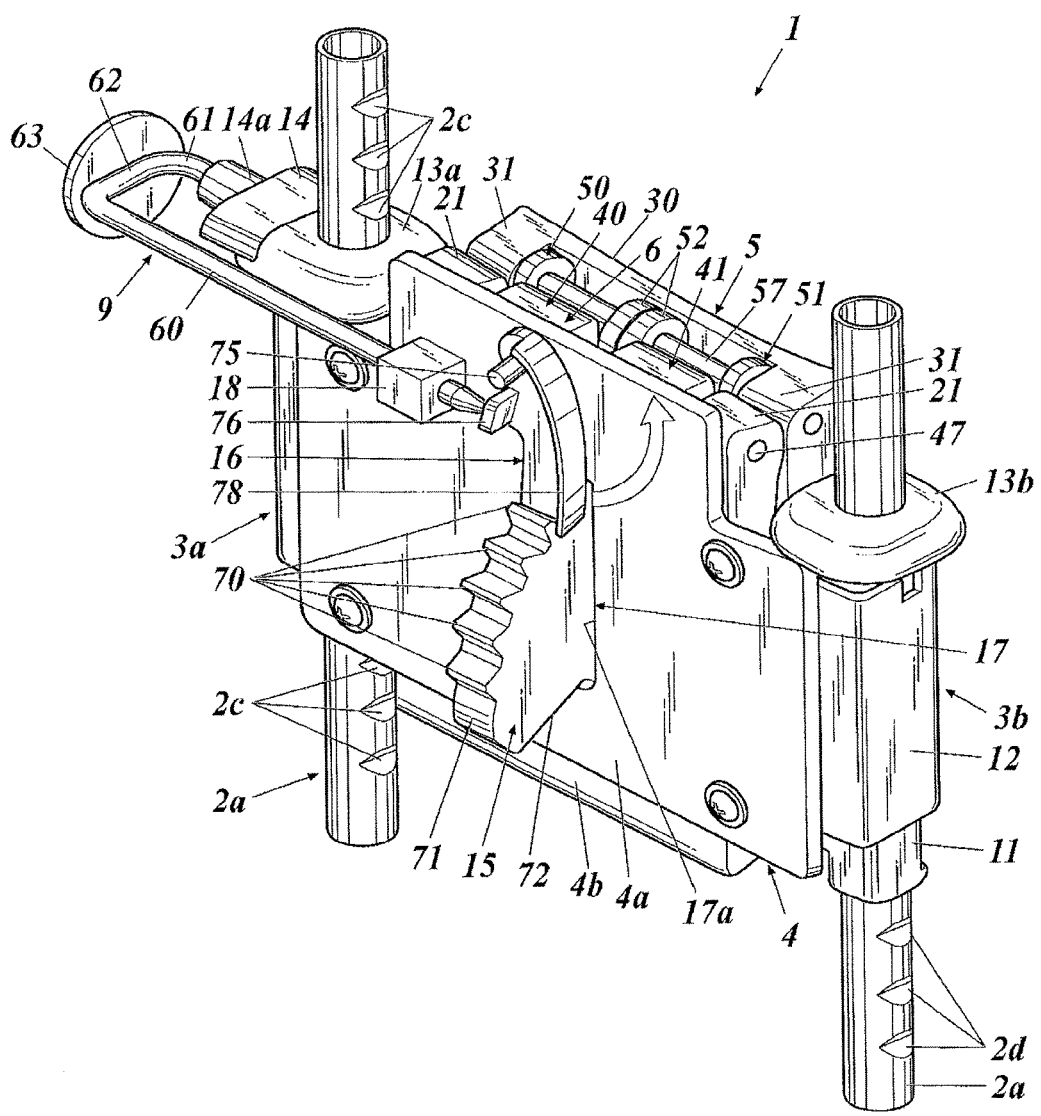
FIG. 2 is a rear perspective view of a headrest before movement.
Figure 7:
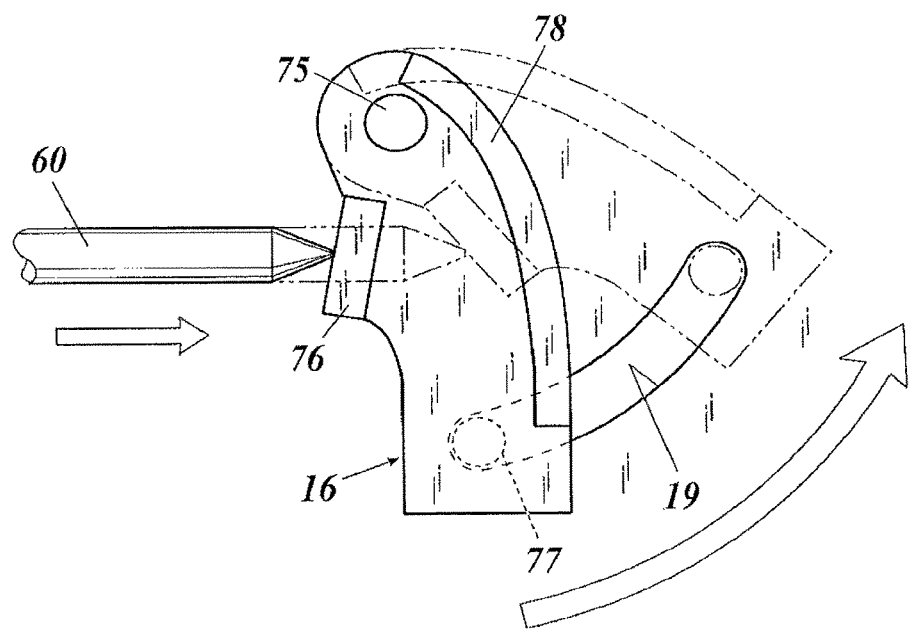
FIG. 7 is an enlarged view illustrating the operation of a lock of a front-rear locking mechanism.

With reference to FIGS. 2 and 7, the base 4a is equipped, on the rear surface, with the locking component 16 of the front-rear locking mechanism, as will be described below.

The body 4b is composed of a resin, and includes a plate 20, supports 21 and 22, fixing portions 23, and reinforcing ribs 24.

The plate 20 abuts on the front surface of the base 4a and is fixed to the base 4a with the fixing portions 23.

The fixing portions 23 are integrated with the plate 20 at least at the four corners and protrude in the right-left direction of the plate 20. The fixing portions 23 are fastened to the base 4a with screws, rivets and the like.

The supports 21 and 22 are connected to the inside linkage segment 6 and the outside linkage segment 7, respectively, of the X linkage and rotatably support the inside linkage segment 6 and the outside linkage segment 7.

The supports 21 and 22 are integrated with the plate 20 at four positions along the vertical and horizontal edges, i.e., at the four corners of the plate 20. The supports 21 and 22 protrude forward from the front surface of the plate 20. In the supports 21 and 22, the supports 21 are disposed at the upper corners whereas the supports 22 are disposed at the lower corners.

The supports 21 and 22 each have a width in the right-left direction larger than its thickness in the front-rear direction (the depth of the forward protrusion). Such wide supports 21 and 22 have high stiffness.

The upper supports 21 each have an opening extending in the right-left direction to receive a coupling rod 47 (described below). The openings of the upper supports 21 are circular holes.

The lower supports 22 each have a larger height in the vertical direction than that of the upper supports 21.

The lower supports 22 each have an opening extending in the right-left direction to receive a coupling rod 58 (described below). The openings of the lower supports 22 are holes vertically elongated along the lower supports 22.

The upper supports 21 and the lower supports 22 are integrated with reinforcing ribs 24 disposed therebetween. The reinforcing ribs 24 are disposed along the respective vertical edges of the plate 20 and connect the right and left outer ends of the upper supports 21 to the right and left outer ends of the lower supports 22, to define lateral walls of the body 4b.

The reinforcing ribs 24 are integrated with the plate 20 at the rear edges, the upper supports 21 at the upper edges, and the lower supports 22 at the lower edges. The reinforcing ribs 24 each have a front recessed edge 26 recessed rearward.

The upper fixing portions 23 aligned above the other fixing portions 23 are disposed at a height different from that of the upper supports 21. According to the embodiment, the upper fixing portions 23 are disposed at a height substantially equal to that of the reinforcing ribs 24. In other words, the upper fixing portions 23 reside at a height between the upper and lower ends of the reinforcing ribs 24.

Although the height of the upper fixing portions 23 differs from that of the upper supports 21 to facilitate the fixation of the body 4b to the base 4a and the insertion of the coupling rod 47 (described below) to the circular openings according to the embodiment, this configuration should not be construed to limit the invention. The upper fixing portions 23 may also be disposed at a height substantially equal to that of the upper supports 21 to increase the stiffness of the stationary unit 4, which feature is not shown.

The lower fixing portions 23 aligned below the upper fixing portions 23 are disposed at a height substantially equal to that of the lower supports 22. In other words, the lower fixing portions 23 reside at a height between the upper and lower ends of the lower supports 22.

The body 4b and the supports 21 and 22 are disposed behind a virtual line V1 connecting the axial centers of the first and second headrest pillars 2a and 2b.

The first and second headrest pillars 2a and 2b are disposed apart from each other and thus have a space therebetween. The space can accommodate the body 4b and the supports 21 and 22 because the base 4a is fixed to the rear surfaces of the pillar retainers 3a and 3b.

The stationary unit 4 further has a clearance 17 at a position corresponding to the lock receiver 15. In specific, the lock receiver 15 is configured to protrude rearward from the stationary unit 4, as will be described below. The clearance 17 of the stationary unit 4 allows the lock receiver 15 to protrude rearward.

The clearance 17 according to the embodiment is a through hole extending through the stationary unit 4 in the front-rear direction, and is composed of a base opening 17a provided in the base 4a and a body opening 17b provided in the body 4b.

Although the clearance 17 is a through hole according to the embodiment, this configuration should not be construed to limit the invention. The clearance 17 may also be a rearward protrusion having an internal space.

The stationary unit 4 further includes a holder 18 to slidably hold a first shaft segment 60 of the operation unit 9.

The stationary unit 4 further includes a limiter 19 which limits the movable range of the locking component 16.

With reference to FIGS. 1 to 6 and 8 to 11, the movable unit 5 is disposed adjacent to the head of an occupant, and can move forward or rearward relative to the stationary unit 4, as described above. The movable unit 5 is composed of a resin, and includes a recessed portion 30, supports 31 and 32, and a headrest casing 33.

The recessed portion 30 is a plate opposed to the plate 20 of the stationary unit 4. The recessed portion 30 has a height in the vertical direction and a width in the right-left direction substantially equal to the height and the width, respectively, of the plate 20.

The recessed portion 30 is centered in the width direction of the movable unit 5 and is bowed rearward. In other words, the recessed portion 30 of the movable unit 5, which is disposed adjacent to the head of the occupant, has a shape suitable for the back of the head of the occupant.

The supports 31 and 32 are connected to the outside linkage segment 7 and the inside linkage segment 6, respectively, of the X linkage and rotatably support the outside linkage segment 7 and the inside linkage segment 6.

The supports 31 and 32 are integrated with the recessed portion 30 at four positions along the vertical and horizontal edges, i.e., at the four corners of the recessed portion 30. The supports 31 and 32 protrude rearward from the rear surface of the recessed portion 30. In the supports 31 and 32, the supports 31 are disposed at the upper corners whereas the supports 32 are disposed at the lower corners.

The supports 31 and 32 each have a width in the right-left direction larger than its thickness in the front-rear direction (the depth of the rearward protrusion). Such wide supports 31 and 32 have high stiffness.

The upper supports 31 each have a circular opening to receive a coupling rod 57 (described below), as in the stationary unit 4. The lower supports 32 also each have an elongated opening to receive a coupling rod 48 (described below). The elongated openings of the lower supports 32 have a longer vertical length than that of the circular openings of the upper supports 31.

The supports 31 and 32 protrude rearward whereas the recessed portion 30 is bowed rearward so as to be recessed, as described above. The depth of the rearward bend (rearward protrusion) of the recessed portion 30 is smaller than that of the rearward protrusion of the supports 31 and 32. In other words, the back face of the recessed portion 30 is disposed within the depth of the rearward protrusion of the supports 31 and 32.

The upper supports 31 and the lower supports 32 have spaces therebetween, instead of ribs like the reinforcing ribs 24 of the stationary unit 4. In other words, the upper supports 31, the lower supports 32, and the recessed portion 30 define, between the upper supports 31 and the lower supports 32, a recessed area 36 having a concave shape as viewed from the side.

Figure 8:
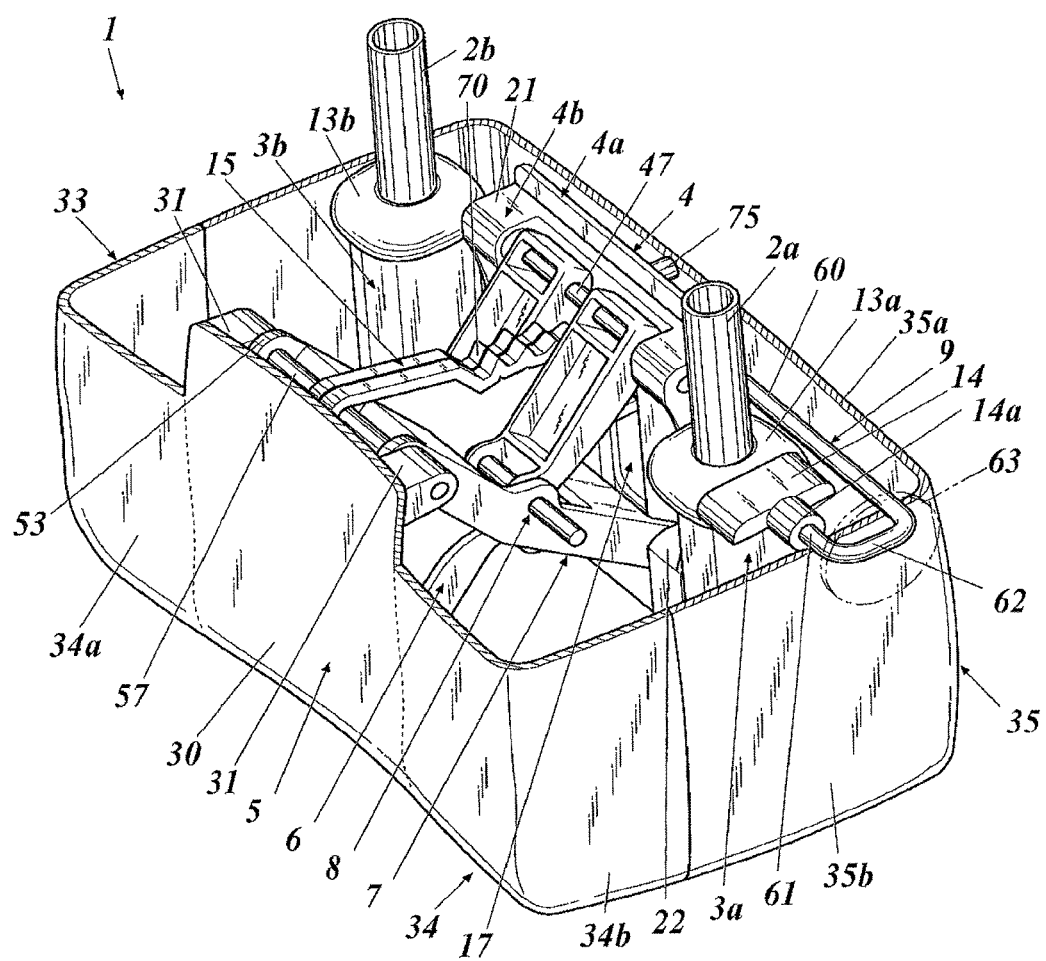
FIG. 8 is an exploded front perspective view of a headrest including a headrest casing housing a moving mechanism.
Figure 9:
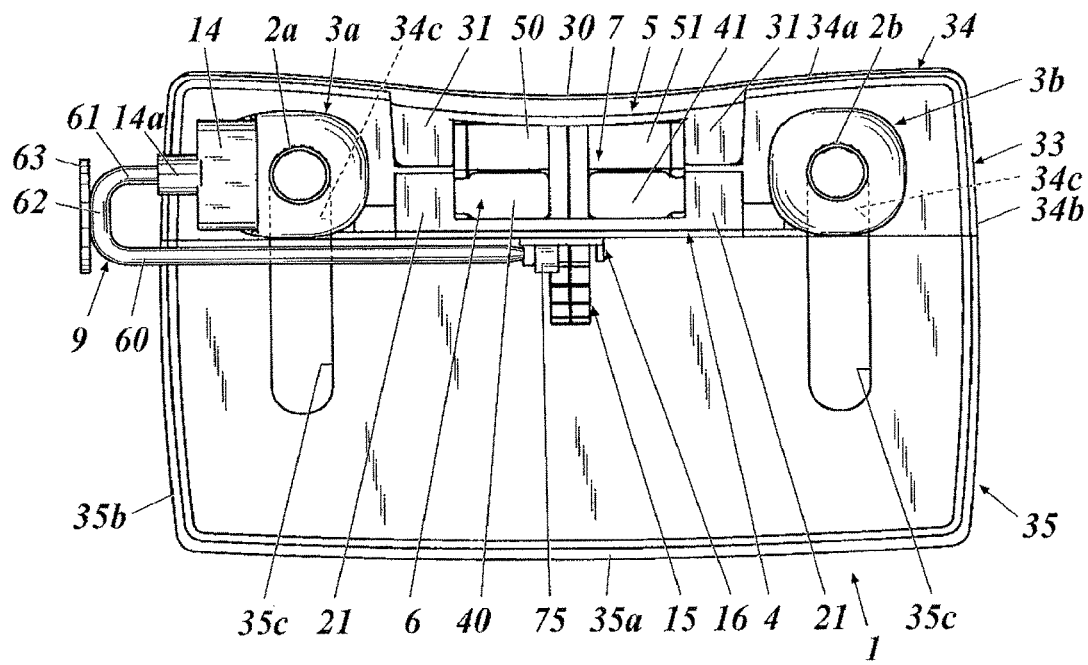
FIG. 9 is a horizontal sectional view of a headrest casing before movement.
Figure 10:
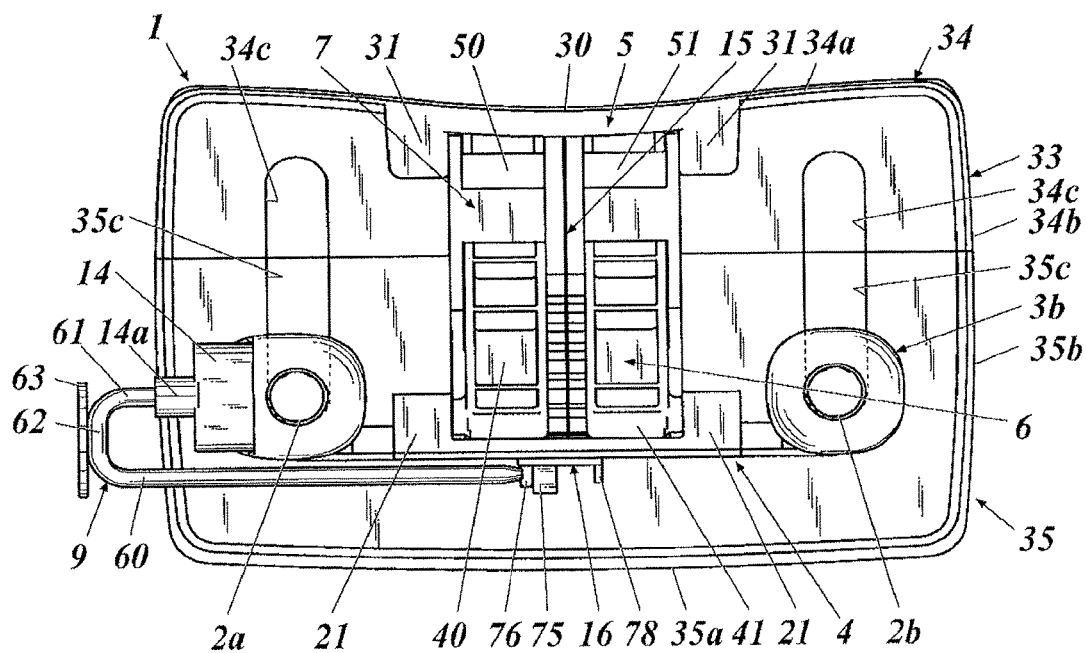
FIG. 10 is a horizontal sectional view of a headrest casing after movement.

With reference to FIGS. 8 to 10, the headrest casing 33 is a hollow housing composed of a front segment 34 and a rear segment 35 and surrounded by the cushion pad.

The front segment 34 has a front face 34a and a periphery 34b extending rearward from the circumferential edge of the front face 34a. The front face 34a is integrated with the recessed portion 30.

The rear segment 35 has a rear face 35a and a periphery 35b extending forward from the circumferential edge of the rear face 35a. The periphery 35b of the rear segment 35 is assembled to the periphery 34b of the front segment 34 to form the headrest casing 33.

The periphery 35b can be assembled to the periphery 34b with any known technique without being limited to the embodiment.

The periphery 34b and the periphery 35b respectively have notches 34c and 35c in the bottoms to receive the first and second headrest pillars 2a and 2b. The notches 34c and 35c each form the half of an elongated hole. In the assembly of the periphery 34b and the periphery 35b, the notches 34c and 35c define two elongated holes in the bottom of the headrest casing 33.

The two elongated holes in the bottom of the headrest casing 33 are oriented such that the longitudinal direction of the elongated holes accords with the direction of the front-rear movement of the movable unit 5.

The headrest casing 33 further has a slit in a side face to allow the outward protrusion of one end of the operation unit 9, which feature is not shown. This slit is also composed of respective notches in the front segment 34 and the rear segment 35, each of which forms the half of the slit, like the notch 34c or 35c.

The portion of the operation unit 9 protruding from the side face of the headrest casing 33 can thus be directly operated when the operation unit 9 is operated.

With reference to FIGS. 1 to 6, the inside linkage segment 6 of the X linkage is disposed adjacent to the stationary unit 4 at the upper end and to the movable unit 5 at the lower end.

The outside linkage segment 7 is disposed adjacent to the movable unit 5 at the upper end and to the stationary unit 4 at the lower end.

These orientations of the inside linkage segment 6 and the outside linkage segment 7 may be inverted.

The upper end of the inside linkage segment 6 is disposed between the right and left upper supports 21 of the stationary unit 4.

The lower end of the outside linkage segment 7 is disposed between the right and left lower supports 22 of the stationary unit 4.

The lower end of the inside linkage segment 6 is disposed between the right and left lower supports 32 of the movable unit 5.

The upper end of the outside linkage segment 7 is disposed between the right and left upper supports 31 of the movable unit 5.

Figure 3:
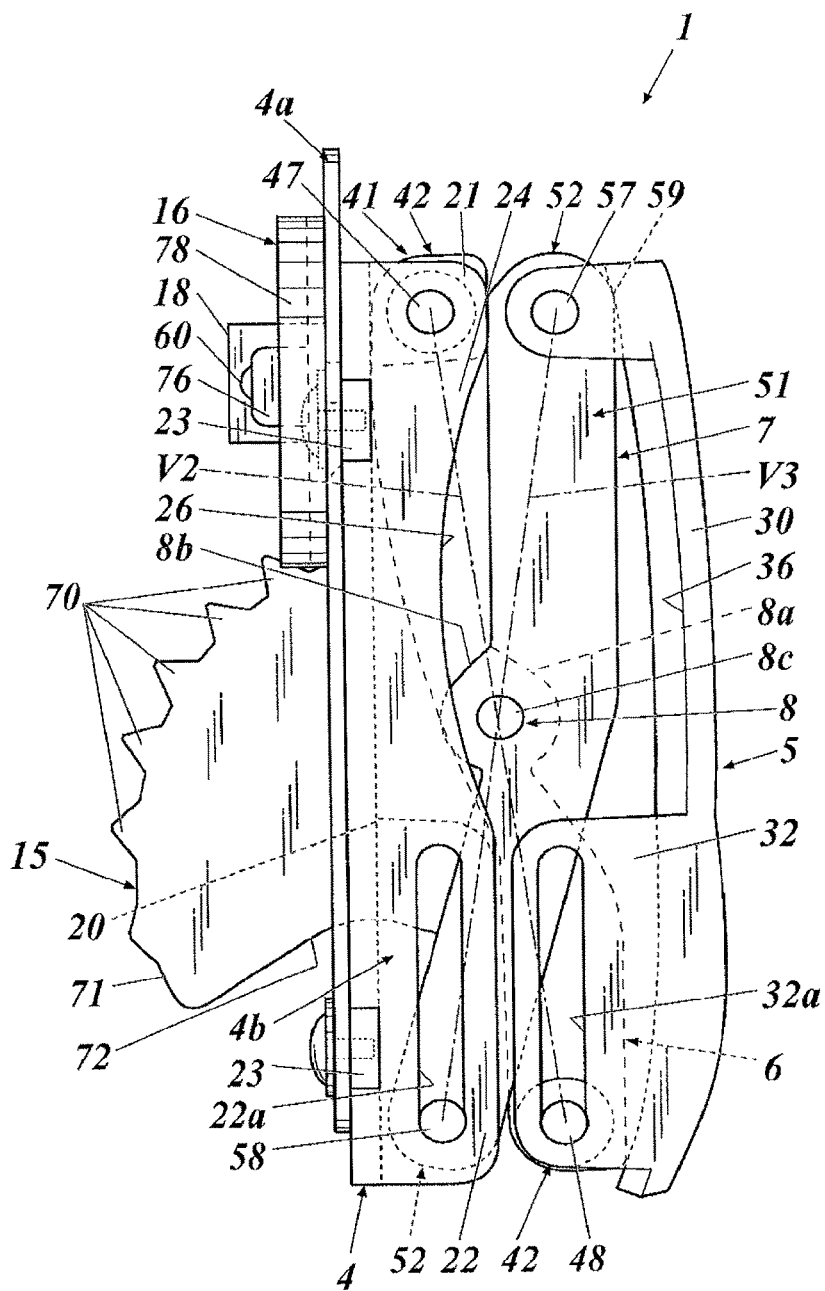
FIG. 3 is a side view of a headrest before movement.
Figure 5:
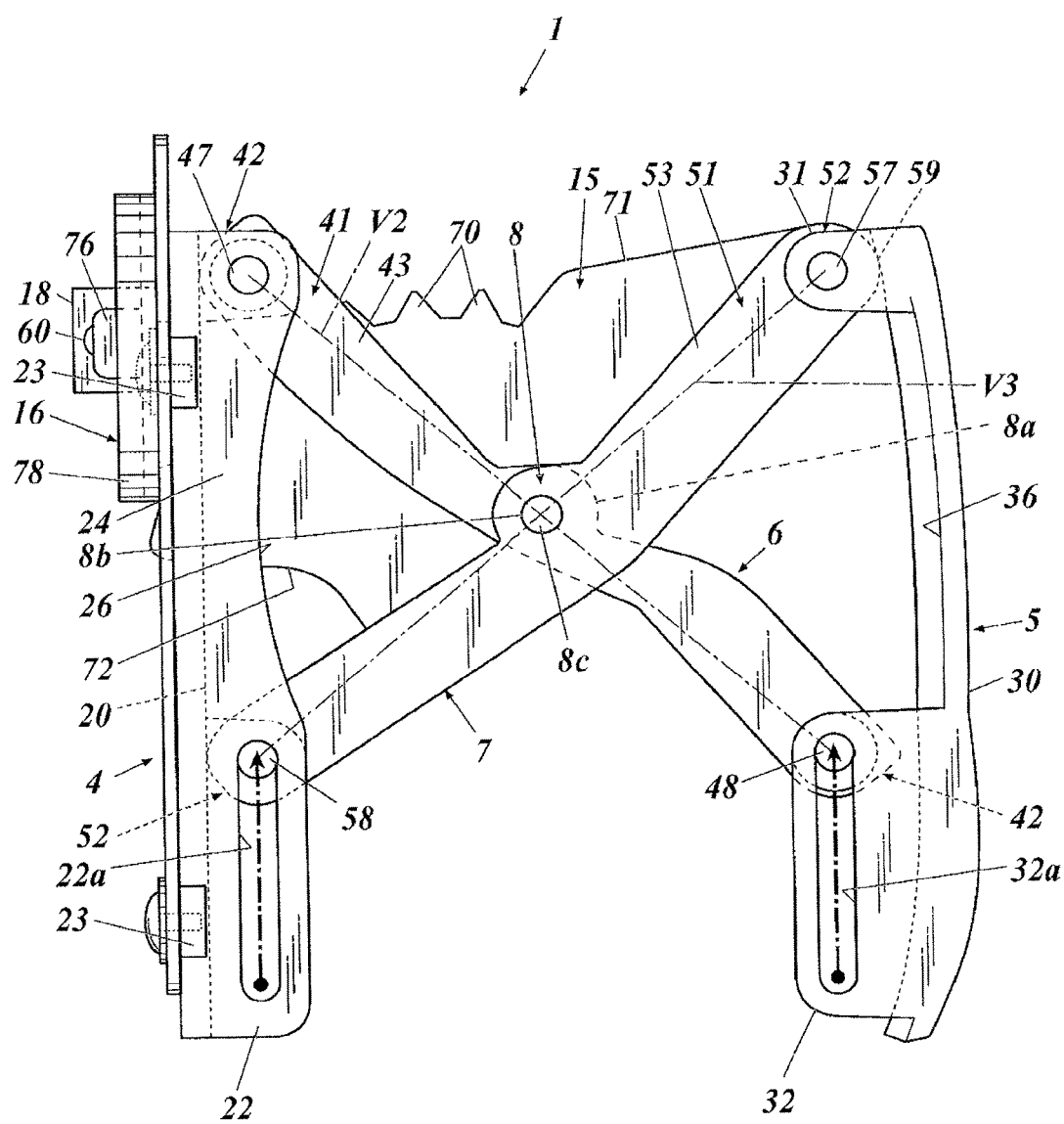
FIG. 5 is a side view of a headrest after movement.

With reference to FIGS. 3 and 5, the inside linkage segment 6 and the outside linkage segment 7 each have a bent shape as viewed from the side. In specific, the inside linkage segment 6 and the outside linkage segment 7 are each bent while being curved forward.

In more detailed description with reference to FIG. 3, the portion of the inside linkage segment 6 above the central intersection 8 is curved rearward whereas the portion of the inside linkage segment 6 below the connecting intersection 8 is curved forward. In other words, the inside linkage segment 6 generally has a substantially S shape as viewed from the side. It is noted that the portion of the inside linkage segment 6 below the connecting intersection 8 slightly extends downward.

In contrast, the outside linkage segment 7 is bent in the vicinity of the central connecting intersection 8 while being generally curved forward. In other words, the outside linkage segment 7 generally has a substantially L shape as viewed from the side.

The inside linkage segment 6 and the outside linkage segment 7 are rotatably connected each other at the central connecting intersection 8, as described above.

In general, an X linkage inevitably has a crossing of one link and the other. The connecting intersection 8 is thus disposed at the crossing of the inside linkage segment 6 and the outside linkage segment 7, which inevitably exists in the X linkage.

With reference to FIGS. 3 and 5, the connecting intersection 8 resides on a virtual line V2 connecting the upper and lower ends of the inside linkage segment 6 and a virtual line V3 connecting the upper and lower ends of the outside linkage segment 7.

The connecting intersection 8 is disposed in a space defined by the recessed edges 26 of the stationary unit 4 and the recessed area 36 of the movable unit 5. In other words, the recessed edges 26 and the recessed area 36 can avoid the interference of the stationary unit 4 and the movable unit 5, respectively, with the connecting intersection 8 during the rearward movement of the movable unit 5.

The connecting intersection 8 is disposed in the forwardmost portion of the inside linkage segment 6 and in the rearmost portion of the outside linkage segment 7.

In other words, the inside linkage segment 6 has forward protrusions 8a in the vicinity of the center of the inside linkage segment 6, whereas the outside linkage segment 7 has rearward protrusions 8b in the vicinity of the center of the outside linkage segment 7. In specific, the protrusions 8a are integrated with the inside linkage segment 6 and protrude forward from near the centers of side walls 43 (described below). The protrusions 8b are integrated with the outside linkage segment 7 and protrude rearward from near the centers of side walls 53 (described below).

The connecting intersection 8 indicates the portion including the side walls 43 (described below) and the protrusions 8a of the inside linkage segment 6, and the side walls 53 (described below) and the protrusions 8b of the outside linkage segment 7.

The side walls 43 and 53 (described below) in the connecting intersection 8 each have a circular opening extending through the side wall 43 or 53 in the right-left direction. The circular openings are opposed to each other and receive a metal connector 8c. The inside linkage segment 6 and the outside linkage segment 7 are thus rotatably connected each other with the connector 8c functioning as a pivot.

The ends of the connector 8c protrude outward from the respective lateral surfaces of the outside linkage segment 7. The protruding ends of the connector 8c are disposed in the space defined by the recessed edges 26 and the recessed area 36.

The inside linkage segment 6 according to the embodiment includes a first arm 40 and a second arm 41, which have connections 42. In other words, the inside linkage segment 6 according to the embodiment is composed of two arms 40 and 41.

The first arm 40 and the second arm 41 are spaced from each other symmetrically in the right-left direction and face the same direction. The space between the first arm 40 and the second arm 41 receives the lock receiver 15, as will be described below. The position of the space between the first arm 40 and the second arm 41 corresponds to the positions of the base opening 17a and the body opening 17b constituting the clearance 17.

The first arm 40 and the second arm 41 each have right and left side walls 43, a central wall 44 connecting the respective side walls 43, end walls 45 at the upper and lower ends, and ribs as reinforcements 46 perpendicular to the longitudinal direction of the first arm 40 or the second arm 41.

The side walls 43, the central wall 44, the end walls 45, and the reinforcements 46 are integrated with one another.

The central wall 44 connects the rear edges of the right and left side walls 43 and the rear edges of the upper and lower end walls 45.

The connections 42 each indicate the upper end of the first arm 40 or the second arm 41 connected to and supported by the upper support 21 of the stationary unit 4 or the lower end of the first arm 40 or the second arm 41 connected to and supported by the lower support 32 of the movable unit 5.

The upper ends of the right and left side walls 43, which function as the upper connection 42 of the first arm 40 or the second arm 41, each have a circular opening. The openings are opposed to each other, and one of the openings is opposed to the circular opening of the upper support 21.

The circular openings of the upper supports 21 and the circular openings of the upper connections 42 receive a metal coupling rod 47. The first arm 40 and the second arm 41 are thus rotatably connected to the stationary unit 4 with the coupling rod 47 functioning as a pivot.

The lower ends of the right and left side walls 43, which function as the lower connection 42 of the first arm 40 or the second arm 41, also each have a circular opening.

The elongated openings of the lower supports 32 and the circular openings of the lower connections 42 receive a metal coupling rod 48. The first arm 40 and the second arm 41 are thus rotatably connected to the movable unit 5 with the coupling rod 48 functioning as a pivot.

The coupling rod 48 is vertically slidable along the elongated openings. The lower ends of the first arm 40 and the second arm 41 are thus vertically slidable along the lower supports 32 in response to the front-rear movement of the movable unit 5.

The outside linkage segment 7 according to the embodiment includes a first arm 50 and a second arm 51, which have connections 52. In other words, the outside linkage segment 7 according to the embodiment is composed of two arms 50 and 51.

The first arm 50 and the second arm 51 are symmetrical in the right-left direction and are integrated with each other with no space therebetween.

The joint between the first arm 50 and the second arm 51 is integrated with the lock receiver 15, as will be described below. In other words, the outside linkage segment 7 is integrated with the lock receiver 15.

The first arm 50 and the second arm 51 each have right and left side walls 53, a central wall 54 disposed in the center between the respective side walls 53, and further ribs as reinforcements 56 perpendicular to the longitudinal direction of the first arm 50 or the second arm 51.

The side walls 53, the central wall 54, and the reinforcements 56 are integrated with one another.

The central wall 54 connects the rear edges of the right and left side walls 53, and is disposed above the connecting intersection 8.

The connections 52 each indicate the upper end of the first arm 50 or the second arm 51 connected to and supported by the lower support 22 of the stationary unit 4 or the lower end of the first arm 50 or the second arm 51 connected to and supported by the upper support 31 of the movable unit 5.

The upper ends of the right and left side walls 53, which function as the upper connection 52 of the first arm 50 or the second arm 51, each have a circular opening. The openings are opposed to each other, and one of the openings is opposed to the circular opening of the upper support 31.

The circular openings of the upper supports 31 and the circular openings of the upper connections 52 receive a metal coupling rod 57. The first arm 50 and the second arm 51 are thus rotatably connected to the movable unit 5 with the coupling rod 57 functioning as a pivot.

The lower ends of the right and left side walls 53, which function as the lower connection 52 of the first arm 50 or the second arm 51, also each have a circular opening.

The elongated openings of the lower supports 22 and the circular openings of the lower connections 52 receive a metal coupling rod 58. The first arm 50 and the second arm 51 are thus rotatably connected to the stationary unit 4 with the coupling rod 58 functioning as a pivot.

The coupling rod 58 is vertically slidable along the elongated openings. The lower ends of the first arm 50 and the second arm 51 are thus vertically slidable along the lower supports 22 in response to the front-rear movement of the movable unit 5.

The lock receiver 15, which is integrated with the outside linkage segment 7, functions as the front-rear locking mechanism (described below). The lock receiver 15 protrudes rearward from the rear surface of the outside linkage segment 7.

The lock receiver 15 passes through the space between the first arm 40 and the second arm 41 of the inside linkage segment 6 and then through the body opening 17b and the base opening 17a of the clearance 17 during the rearward movement of the movable unit 5 toward the stationary unit 4.

The lock receiver 15 is supported by the connector 8c provided in the connecting intersection 8. In specific, the connector 8c has an outer diameter substantially equal to the inner diameter of the circular openings in the connecting intersection 8 such that the connector 8c can rotate in the circular openings, and thus can support the lock receiver 15.

Figure 6:
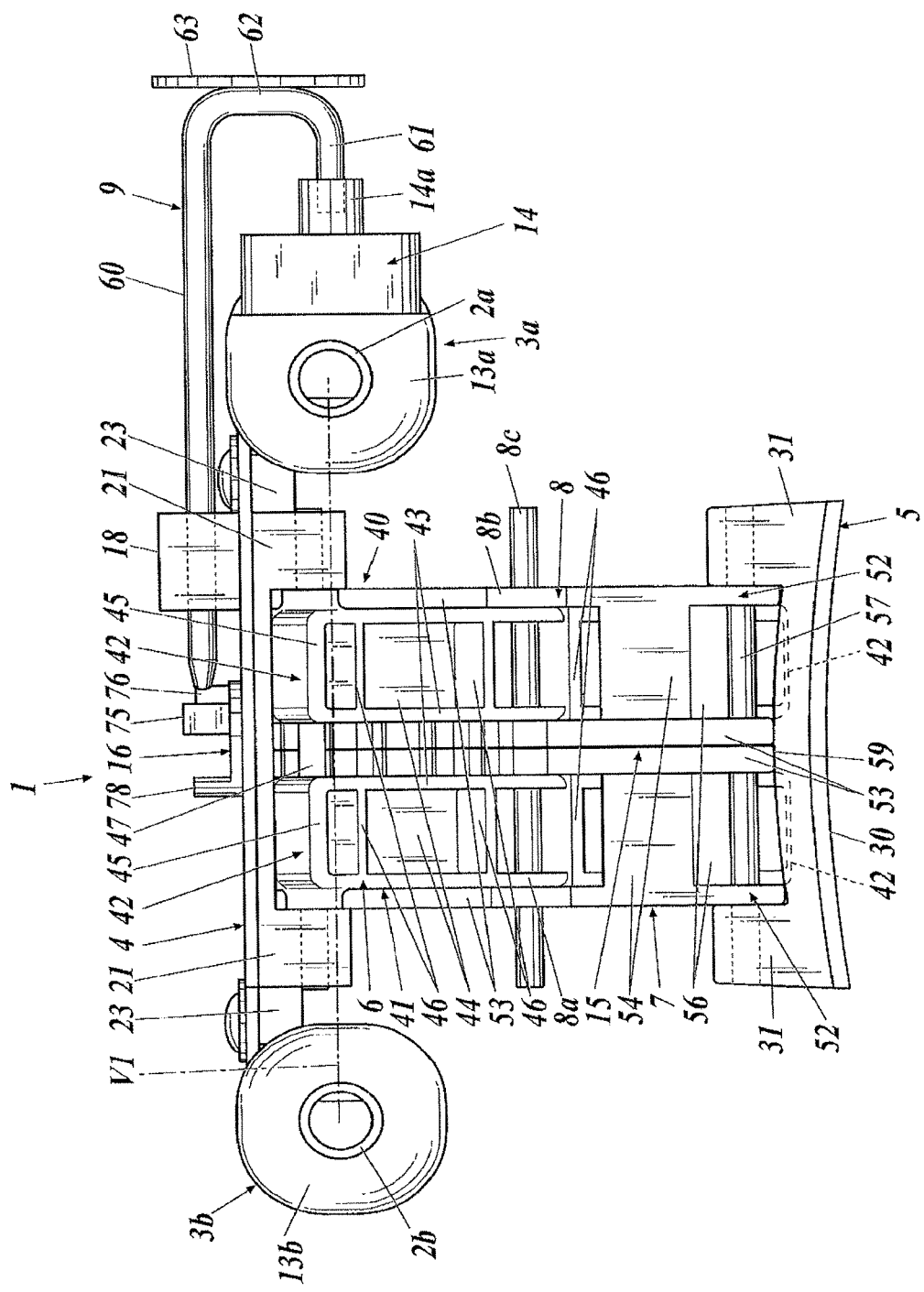
FIG. 6 is a plan view of a headrest after movement.

With reference to FIG. 6, the front ends of the side walls 53 of the outside linkage segment 7 integrated with the lock receiver 15 function as an abutting portion 59, which abuts on the back face of the recessed portion 30 of the movable unit 5. In other words, the X linkage has the abutting portion 59 abutting on the back face of the recessed portion 30.

The back face of the recessed portion 30 is disposed within the depth of the rearward protrusion of the supports 31 and 32, as described above. The abutting portion 59, which abuts on the back face of the recessed portion 30, is thus also disposed within the depth of the rearward protrusion of the supports 31 and 32.

With reference to FIGS. 1 to 6, the ends of the inside linkage segment 6 and the outside linkage segment 7 adjacent to the movable unit 5 are also disposed within the depth of the rearward protrusion of the supports 31 and 32. The ends of the inside linkage segment 6 and the outside linkage segment 7 adjacent to the stationary unit 4 are disposed within the depth of the forward protrusion of the supports 21 and 22 of the stationary unit 4.

At least one of the inside linkage segment 6 and the outside linkage segment 7 has a substantially U-shaped cross section.

According to the embodiment, the inside linkage segment 6 and the outside linkage segment 7 include the first arms 40 and 50 and the second arms 41 and 51, respectively, and thus both have substantially U-shaped cross sections.

The first arm 50 and the second arm 51 of the outside linkage segment 7 each include right and left side walls 53. The left side wall 53 of the first arm 50 and the right side wall 53 of the second arm 51 respectively serve as the left and right lateral surfaces of the outside linkage segment 7.

The distance between the left side wall 53 of the first arm 50 and the right side wall 53 of the second arm 51 is larger than the width of the inside linkage segment 6 in the right-left direction. With reference to FIG. 3, the inside linkage segment 6 is at least partially accommodated in the space between the left side wall 53 of the first arm 50 and the right side wall 53 of the second arm 51 of the outside linkage segment 7 after the rearward movement of the movable unit 5.

The reinforcements 46 and 56 are opposed to the connecting intersection 8. The reinforcements 46 and 56 are also each opposed to the connection 42 or 52 of the inside linkage segment 6 or the outside linkage segment 7 connected to the stationary unit 4, or the connection 42 or 52 of the inside linkage segment 6 or the outside linkage segment 7 connected to the movable unit 5.

In specific, the reinforcements 46 and 56 each face the connection 42 or 52. The reinforcements 46 and 56 are disposed along the longitudinal direction of the coupling rods 47, 48, 57, and 58 perpendicular to the longitudinal direction of the first arms 40 and 50 and the second arms 41 and 51.

The reinforcements 46 and 56 disposed adjacent to the connections 42 and 52, respectively, as described above, are preferred to effectively reinforce the connections 42 and 52.

The front-rear locking mechanism will now be described in more detail.

The front-rear locking mechanism is disposed in the space between the first and second headrest pillars 2a and 2b. The front-rear locking mechanism can thus be disposed in the vicinity of the first and second headrest pillars 2a and 2b.

The stationary unit 4 is equipped with the locking component 16 of the front-rear locking mechanism on the rear surface and with the X linkage on the front surface.

The following description focuses on the detailed configuration of the lock receiver 15.

The lock receiver 15 of the front-rear locking mechanism is integrated with the outside linkage segment 7, as described above. The lock receiver 15 is disposed in the center between the first and second headrest pillars 2*a* and 2*b*. The lock receiver 15 is integrated with the rear ends of the right side wall 53 of the first arm 50 and the left side wall 53 of the second arm 51 of the outside linkage segment 7, and protrudes rearward.

In other words, the outside linkage segment 7 is also disposed in the center between the first and second headrest pillars 2*a* and 2*b*. The inside linkage segment 6, the stationary unit 4, and the movable unit 5 are thus also disposed in the center between the first and second headrest pillars 2*a* and 2*b*.

With reference to FIGS. 2, 3, and 5, the lock receiver 15 protrudes rearward from the stationary unit 4 in response to the rearward movement of the movable unit 5. The lock receiver 15 is thus disposed behind the first and second headrest pillars 2*a* and 2*b* after the rearward movement of the movable unit 5.

The disposition of the lock receiver 15 behind the first and second headrest pillars 2*a* and 2*b* is achieved by the clearance 17 of the stationary unit 4.

The lock receiver 15 includes a ratchet mechanism having multiple teeth 70, which are arranged on an arc line corresponding to the rotation of the X linkage. The teeth 70 are integrated with the lock receiver 15.

With reference to FIGS. 3 and 5, the lock receiver 15 has an upper surface 71 extending rearward from the upper ends of the side walls 53 integrated therewith along an arc profile curved upward (or rearward). The lock receiver 15 has a bottom surface 72 extending rearward from lower central portions of the side walls 53 along an arc profile curved upward. The arc profile of the upper surface 71 is gentler than that of the bottom surface 72. The lock receiver 15 is tapered rearward and extends downward. In other words, the lock receiver 15 has a substantially tongue shape as viewed from the side.

The lock receiver 15 thus can protrude rearward from the stationary unit 4 in response to the rearward movement of the movable unit 5.

The teeth 70 are disposed on the upper surface 71 of the lock receiver 15. The teeth 70 each have a substantially triangle shape as viewed from the side.

The arc upper surface 71 has a curvature corresponding to the rotation of the outside linkage segment 7. The arrangement of the teeth 70 on the upper surface 71 thus also corresponds to the rotation of the outside linkage segment 7.

Accordingly, the teeth 70 travel along a certain path. The locking component 16, which is disposed in the path of the teeth 70, can thus lock the movable unit 5 movable forward or rearward.

The following description focuses on the detailed configuration of the locking component 16.

The locking component 16 of the front-rear locking mechanism is mounted on the rear surface of the base 4*a* of the stationary unit 4.

With reference to FIGS. 2 and 7, the locking component 16 can be moved with the operation unit 9 in the right-left direction to engage with or separate from the lock receiver 15.

In specific, the rear surface of the base 4*a* of the stationary unit 4 is integrated with a metal rod 75 protruding rearward at a position above the clearance 17. The rod 75 swingably supports the locking component 16 while allowing the locking component 16 to move in the right-left direction.

The locking component 16 is operated with the operation unit 9, as described above. In particular, the locking component 16 is operated with the first shaft segment 60 of the operation unit 9.

With reference to FIG. 7, the locking component 16 has a contact 76 to receive the tip of the first shaft segment 60. The locking component 16 is integrated with the contact 76 at the lateral end adjacent to the operation unit 9.

The locking component 16 can separate from the lock receiver 15 in response to the shift of the contact 76 caused by the rightward movement of the first shaft segment 60.

The movable range of the locking component 16 is limited by the limiter 19, as described above. In other words, the stationary unit 4 includes a limiter 19 to limit the movable range of the locking component 16. The locking component 16 includes a restricting rod 77 that slides along and only in the limiter 19.

With reference to FIG. 7, the limiter 19 is an arc groove provided in the base 4*a* of the stationary unit 4. The restricting rod 77 is integrated with the front surface of the locking component 16 and is inserted in the groove serving as the limiter 19. The locking component 16 thus can swing in the right-left direction within the range corresponding to the sliding of the restricting rod 77 between one end and the other end of the limiter 19.

The locking component 16 further has a flange 78 at the lateral end distant from the operation unit 9.

The flange 78 is integrated with the locking component 16 and extends along the edge of the locking component 16 distant from the operation unit 9.

The flange 78 should preferably be disposed in the vicinity of the rod 75 of the locking component 16, which often undergoes stress from various directions.

The vertical locking mechanism will now be described in more detail.

The vertical locking mechanism is provided to the first and second headrest pillars 2*a* and 2*b* to engage or disengage the stationary unit 4 with or from the first and second headrest pillars 2*a* and 2*b* at multiple vertical positions.

The vertical locking mechanism includes the pillar retainers 3*a* and 3*b* and the notches 2*c* on the first and/or second headrest pillar(s) 2*a* and/or 2*b*.

The locking unit 14 mounted on the head 13*a* of the pillar retainer 3*a* engages with the notches 2*c* formed on at least one of the first and second headrest pillars 2*a* and 2*b*.

According to the embodiment, the notches 2*c* are formed on the first headrest pillar 2*a*, which is held by the pillar retainer 3*a* equipped with the locking unit 14 in the pillar retainers 3*a* and 3*b*.

The notches 2*c* reside at multiple positions along the longitudinal direction of the first headrest pillar 2*a*. The notches 2*c* are disposed on the periphery of the first headrest pillar 2*a* on the right of the axial center.

The locking unit 14 is disposed on the left of the head 13*a*. The locking unit 14 includes a retainer 14*a* to hold the tip of a second shaft segment 61 of the operation unit 9. The locking unit 14 moves in the right-left direction relative to the head 13*a* in response to an operation of the operation unit 9.

The locking unit 14 further includes an engaging member (not shown) engageable with one of the notches 2*c* inside the head 13*a*, and a biasing member (not shown) for urging the engaging member to engage with the notch 2*c*.

The engaging member is a ring and has a central opening that receives the first headrest pillar 2*a*, which feature is not shown. The engaging member can move in the right-left direction in response to an operation of the operation unit 9.

The engaging member engages with the notch 2*c* inside the head 13*a* due to the biasing force of the biasing member in a standby mode. In contrast, the engaging member disengages from the notch 2c inside the head 13a in response to the operation.

In other words, the vertically movable pillar retainer 3a is locked in the standby mode of the locking unit 14, and is unlocked in response to the push of the locking unit 14 toward the first headrest pillar 2a.

The biasing member is a flexible component, such as a compressed spring and the like, which urges the engaging member to move apart from the first headrest pillar 2a (in the leftward direction in the embodiment).

Although the engaging member is urged by the biasing member to move apart from the first headrest pillar 2a, the engaging member receives the first headrest pillar 2a in the central hole of the engaging member. Thus, the portion of the engaging member on the right of the central hole engages with the notch 2c.

The vertical locking mechanism having such a configuration can engage or disengage the stationary unit 4 with or from the first and second headrest pillars 2a and 2b at multiple vertical positions, i.e., the positions of the notches 2c.

Although the locking unit 14 includes the engaging member and the biasing member according to the embodiment, this configuration should not be construed to limit the invention. In specific, the locking unit 14 may be any other unit that can operate in response to an operation of the operation unit 9 to engage or disengage the stationary unit 4 with or from the first and second headrest pillars 2a and 2b at multiple vertical positions.

Figure 4:
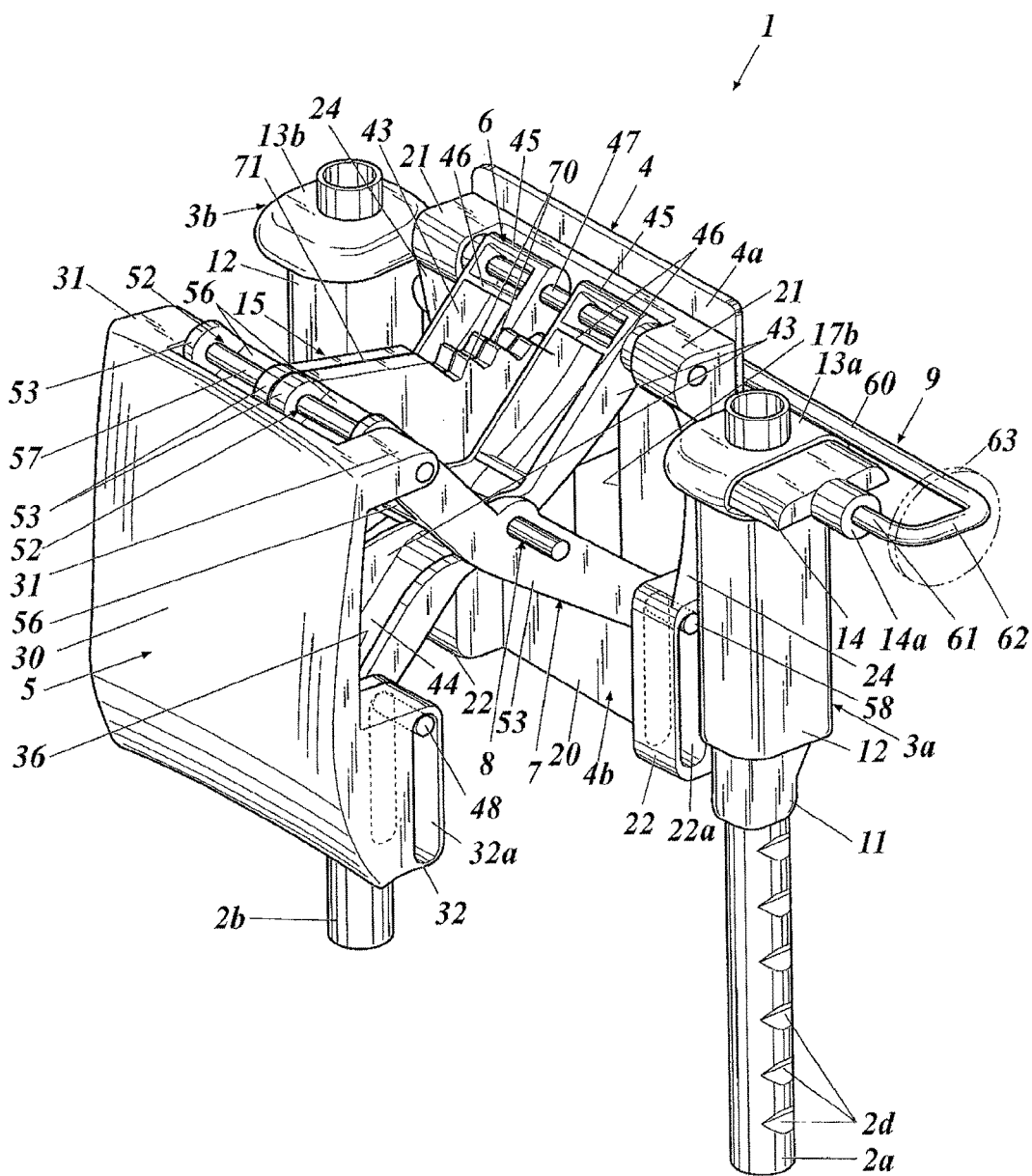
FIG. 4 is a front perspective view of a headrest after movement.

The operation unit 9 will now be described in more detail. With reference to FIGS. 2, 4, and 6, the operation unit 9 has a substantially J shape, and includes a first shaft segment 60, a second shaft segment 61, and a connecting shaft segment 62. The first shaft segment 60 and the second shaft segment 61 move in the same direction together with the connecting shaft segment 62.

The first shaft segment 60, the second shaft segment 61, and the connecting shaft segment 62 are integrated with one another. In other words, the operation unit 9 is fabricated by bending a single metal shaft.

The first shaft segment 60 operates the locking component 16 to unlock the front-rear locking mechanism, as described above. Since the tip of the first shaft segment 60 abuts on the contact 76 of the locking component 16, the right-left movement of the first shaft segment 60 can swing the locking component 16 in the right-left direction.

The first shaft segment 60 is parallel to the second shaft segment 61 and is longer than the second shaft segment 61.

The first shaft segment 60 is disposed behind the stationary unit 4, and thus does not inhibit the movement of the X linkage disposed in front of the stationary unit 4.

The stationary unit 4 includes a holder 18 to slidably hold the first shaft segment 60, as described above. The holder 18 can reduce vibrations of the first shaft segment 60 moving in the right-left direction.

In specific, the holder 18 has a through hole extending through the holder 18 in the right-left direction. The through hole receives the first shaft segment 60. The inner diameter of the through hole is substantially equal to the outer diameter of the first shaft segment 60 such that the first shaft segment 60 can slide in the through hole in the right-left direction.

The second shaft segment 61 operates the locking unit 14 to unlock the vertical locking mechanism, as described above. Since the tip of the second shaft segment 61 is held by the retainer 14a of the locking unit 14, the right-left movement of the second shaft segment 61 can shift the locking unit 14 in the right-left direction.

The second shaft segment 61 is substantially parallel to the first shaft segment 60 and is shorter than the first shaft segment 60.

The locking component 16 of the front-rear locking mechanism is disposed at a height substantially equal to that of the locking unit 14 for locking or unlocking the vertical locking mechanism. The first shaft segment 60 and the second shaft segment 61 are thus disposed at substantially the same height.

According to the embodiment, the operation unit 9 is oriented such that the first shaft segment 60 and the second shaft segment 61 are aligned in parallel in the horizontal direction.

The connecting shaft segment 62 connects one end of the first shaft segment 60 to one end of the second shaft segment 61. An operation of the connecting shaft segment 62 in the right-left direction can move the first shaft segment 60 and the second shaft segment 61 together in the right-left direction.

Accordingly, a direct operation of the connecting shaft segment 62 can unlock both the front-rear locking mechanism and the vertical locking mechanism. In specific, the push of the connecting shaft segment 62 rightward, i.e., in the axial direction of the first shaft segment 60 and the second shaft segment 61, can unlock both the front-rear locking mechanism and the vertical locking mechanism.

With reference to FIG. 6, the connecting shaft segment 62 is integrated with an operational plate 63 having a diameter larger than the distance between the respective axial centers of the first shaft segment 60 and the second shaft segment 61. The operational plate 63 according to the embodiment is a metal disk.

The operational plate 63 integrated with the connecting shaft segment 62 can readily transmit the pushing force on the operation unit in the axial direction of the first shaft segment 60 and the second shaft segment 61 to the first shaft segment 60 and the second shaft segment 61.

Although the operational plate 63 has a diameter larger than the distance between the respective axial centers of the first shaft segment 60 and the second shaft segment 61 according to the embodiment, this configuration should not be construed to limit the invention. For example, the operational plate 63 may be replaced with a button protruding outward from the surface of the cushion pad.

The front-rear locking mechanism and the vertical locking mechanism are unlocked through the rightward push of the connecting shaft segment 62, and are locked through stopping the rightward push of the connecting shaft segment 62 and thus returning the operation unit 9 to the original position.

In specific, the locking unit 14 includes the biasing member, as described above. The biasing force of the biasing member returns the operation unit 9 to the original position.

The biasing member of the locking unit 14 may be replaced with any other biasing member that can return the operation unit 9 to the original position. For example, the holder 18 that holds the first shaft segment 60 may include a biasing member to return the first shaft segment 60 to the original position.

The mode of mounting the headrest 1 to the seat back frame 10a will now be described.

Figure 11:
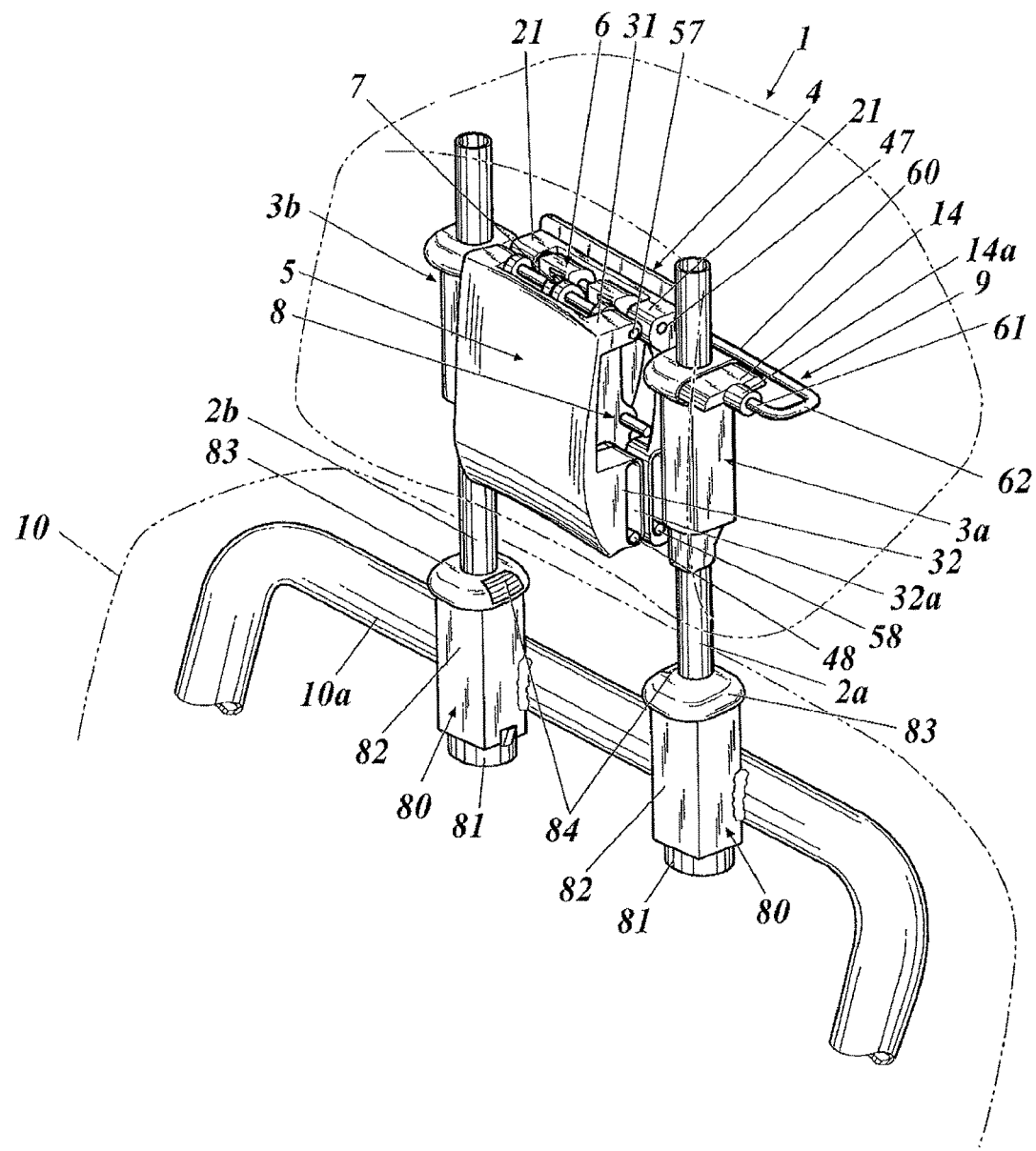
FIG. 11 is a perspective view illustrating a mode of mounting a headrest to a seat back.

According to the embodiment, the seat back frame 10a is equipped with a pair of holders 80 at the upper end, as illustrated in FIG. 11. The holders 80 respectively hold the first and second headrest pillars 2a and 2b.

The first and second headrest pillars 2a and 2b are vertically slidable relative to the respective holders 80 and can be vertically moved, and thus the positions of the first and second headrest pillars 2a and 2b can be stepwise adjusted.

The holders 80 each include a cylindrical base 81 to hold the first or second headrest pillar 2a or 2b, a cover 82 surrounding the cylindrical base 81, and a head 83 integrated with the top end of the cylindrical base 81.

The heads 83 are each provided with a lock 84 to prevent the extraction of the first or second headrest pillar 2a or 2b.

The cylindrical bases 81 each have a through hole extending in the longitudinal direction to receive the first or second headrest pillar 2a or 2b.

The covers 82 are each fabricated by bending a metal plate into a rectangular tube, and hold the cylindrical base 81. The covers 82 are fixed to the seat back frame 10a.

The heads 83 each have a central opening in communication with the through hole of the cylindrical base 11. The heads 83 are exposed from the top end of the seat back 10.

The locks 84 have the same function as that of the locking unit 14. In other words, the push of the locks 84 can unlock the pillars. The locks 84 return to the original positions in response to the stop of the push, and can lock the first and second headrest pillars 2a and 2b to prevent the movement of the first and second headrest pillars 2a and 2b in the extraction direction.

The first and second headrest pillars 2a and 2b are each provided with multiple notches 2d engageable with the lock 84.

The first and second headrest pillars 2a and 2b can be shifted to multiple vertical positions corresponding to the respective notches 2d. In other words, the first and second headrest pillars 2a and 2b include another vertical locking mechanism in addition to the pillar retainers 3a and 3b, so that the position of the headrest 1 can be adjusted more finely.

The holders 80 are disposed such that the locks 84 face the center between the first and second headrest pillars 2a and 2b.

The notches 2d are thus formed on the peripheries of the first and second headrest pillars 2a and 2b on their outer sides. In other words, the first headrest pillar 2a has notches 2d on the left-side periphery whereas the second headrest pillar 2b has notches 2d on the right-side periphery.

The notches 2d on the periphery of the first headrest pillar 2a thus face the direction opposite to the notches 2c.

The operations of the headrest 1 having the above-described configuration will now be explained.

The operations of the headrest 1 include the forward movement of the movable unit 5 apart from the stationary unit 4 and the rearward returning movement of the movable unit 5 close to the stationary unit 4 from the position apart from the stationary unit 4. The operations of the headrest 1 also include the vertical movement of the pillar retainers 3a and 3b along the respective first and second headrest pillars 2a and 2b.

The following explanation focuses on the movement of the movable unit 5.

FIG. 9 illustrates the movable unit 5 closest to the stationary unit 4, i.e., after the reward returning movement, as mentioned above. In the standby mode of the operation unit 9, the lower end of the locking component 16 engages with one of the teeth 70 of the lock receiver 15 to lock the movable unit 5 movable forward or rearward.

In order to move such a movable unit 5 forward apart from the stationary unit 4, the connecting shaft segment 62 of the operation unit 9 is pushed toward the first headrest pillar 2a to move the first shaft segment 60 rightward, thereby swinging the locking component 16 rightward via the contact 76, as illustrated in FIG. 7.

This operation makes the lower end of the locking component 16 separated from the tooth 70 of the lock receiver 15, and can thus disengage the locking component 16 to allow the movable unit 5 to move in the front-rear direction.

The movable unit 5 is then moved forward apart from the stationary unit 4 while the locking component 16 remains inclined rightward.

The lock receiver 15 rotates forward in conjunction with the rotation of the outside linkage segment 7. The coupling rod 48 in the inside linkage segment 6 and the coupling rod 58 in the outside linkage segment 7 slide upward along the respective elongated openings of the lower supports 32 and 22 in conjunction with the rotation of the inside linkage segment 6 and the outside linkage segment 7.

In response to the stop of the push operation of the operation unit 9 at any state, the locking component 16 swings leftward to the original position to engage with another one of the teeth 70 of the lock receiver 15. This operation can move the movable unit 5 forward apart from the stationary unit 4 and then lock the movable unit 5 at a desired position, as illustrated in FIG. 10.

It is noted that the locking component 16 may come into contact with the side face of a tooth 70 instead of fitting in the valley between adjacent teeth 70 during the operation. In such a case, the movable unit 5 should be slightly shifted forward or rearward with no operation of the operation unit 9. The locking component 16 then enters the nearest valley and thus can lock the movable unit 5.

In order to move the movable unit 5 rearward, the connecting shaft segment 62 of the operation unit 9 is also pushed to move the first shaft segment 60, thereby disengaging the locking component 16.

The push operation of the operation unit 9 is then stopped after the rearward movement of the movable unit 5 to any position or the position illustrated in FIG. 9. The lock receiver 15 and the X linkage each move in the opposite direction compared to that in the forward movement of the movable unit 5.

Accordingly, the movable unit 5 can be moved in the front-rear direction adjustably to multiple positions corresponding to the arrangement of the teeth 70 of the lock receiver 15. The position of the headrest 1 can thus be adjusted stepwise in the front-rear direction.

The following explanation focuses on the movement of the pillar retainers 3a and 3b.

FIG. 1 illustrates the pillar retainers 3a and 3b disposed in respective lower portions of the first and second headrest pillars 2a and 2b. In the standby mode of the operation unit 9, the engaging member of the locking unit 14 engages with one of the notches 2c in the lower portion of the first headrest pillar 2a, to lock the pillar retainers 3a and 3b so as not to move vertically.

In order to move such pillar retainers 3a and 3b upward along the first and second headrest pillars 2a and 2b, respectively, the connecting shaft segment 62 of the operation unit 9 is pushed toward the first headrest pillar 2a to move the second shaft segment 61 rightward, thereby shifting the engaging member of the locking unit 14 rightward via the retainer 14a.

This operation moves the engaging member of the locking unit 14 apart from the notch 2c of the first headrest pillar 2a, and can thus disengage the engaging member of the locking unit 14 to allow the pillar retainers 3a and 3b to move in the vertical direction.

The pillar retainers 3a and 3b are then moved upward along the first and second headrest pillars 2a and 2b, respectively, while the engaging member of the locking unit 14 remains at the rightward shifted position.

The components, such as the stationary unit 4, the movable unit 5, and the X linkage, are shifted upward in conjunction with the movement of the pillar retainers 3a and 3b.

In response to the stop of the operation of the operation unit 9 at any state, the engaging member of the locking unit 14 returns leftward to the original position due to the biasing force of the biasing member, to engage with another one of the notches 2c in an upper portion of the first headrest pillar 2a. This operation can move the pillar retainers 3a and 3b upward along the first and second headrest pillars 2a and 2b, respectively, and then lock the pillar retainers 3a and 3b at desired positions, as illustrated in FIG. 4.

It is noted that the engaging member of the locking unit 14 may come into contact with a portion of the periphery of the first headrest pillar 2a between adjacent upper and lower notches 2c during the operation. In such a case, the pillar retainers 3a and 3b should be slightly shifted upward or rearward with no operation of the operation unit 9. The engaging member then engages with the nearest notch 2c and thus can lock the pillar retainers 3a and 3b.

In order to move the pillar retainers 3a and 3b downward, the connecting shaft segment 62 of the operation unit 9 is also pushed to move the second shaft segment 61, thereby disengaging the engaging member of the locking unit 14.

The push operation of the operation unit 9 is then stopped after the downward movement of the pillar retainers 3a and 3b to any position or the position illustrated in FIG. 1. The components, such as the stationary unit 4, the movable unit 5, and the X linkage, are also shifted downward in conjunction with the movement of the pillar retainers 3a and 3b.

Accordingly, the pillar retainers 3a and 3b can be moved in the vertical direction adjustably to multiple positions corresponding to the respective notches 2c of the first headrest pillar 2a. The headrest 1 can thus be shifted adjustably to multiple vertical positions.

The above embodiments should not be construed to limit the invention, and can be modified without departing from the gist of the invention. Some modifications will now be described below.

Modification 1

The lock receiver 15 is integrated with the outside linkage segment 7 according to the above embodiments. Alternatively, the lock receiver 15 may be integrated with the inside linkage segment 6, which feature is not shown.

The lock receiver 15 integrated with the inside linkage segment 6 protrudes rearward from the rear surface of the inside linkage segment 6, for example. This modification requires changes in the curvatures of the arc profiles of the upper surface 71 and the bottom surface 72 of the lock receiver 15 and thus a change in the arrangement of the teeth 70. For example, the teeth 70 are disposed on the upper surface 71 having a smaller curvature.

The lock receiver 15 integrated with the inside linkage segment 6 can also rotate in conjunction with the inside linkage segment 6, like the lock receiver 15 integrated with the outside linkage segment 7. In other words, the X linkage and the front-rear locking mechanism can move together. The movable unit 5 can thus be readily shifted in the front-rear direction.

This modification can satisfy the requirement for the ready adjustment of the position of the movable unit 5 in the front-rear direction through the association of the movement of the X linkage and the front-rear locking mechanism.

Modification 2

The lock receiver 15 is disposed in the center between the first and second headrest pillars 2a and 2b according to the above embodiments. Alternatively, the lock receiver 15 may be disposed in a right or left portion relative to the center between the first and second headrest pillars 2a and 2b, which feature is not shown.

The lock receiver 15 deviated to one side protrudes rearward from the rear surface of the first arm 40 or the second arm 41 of the inside linkage segment 6, for example.

The position of the lock receiver 15, which is disposed in the right or left portion relative to the center between the first and second headrest pillars 2a and 2b, is deviated from the center to one side. The X linkage thus can have an increased width corresponding to the deviated length of the lock receiver 15.

This modification can satisfy the requirement for an increase in width of the X linkage corresponding to the deviated length of the lock receiver 15.

Modification 3

Figure 12:
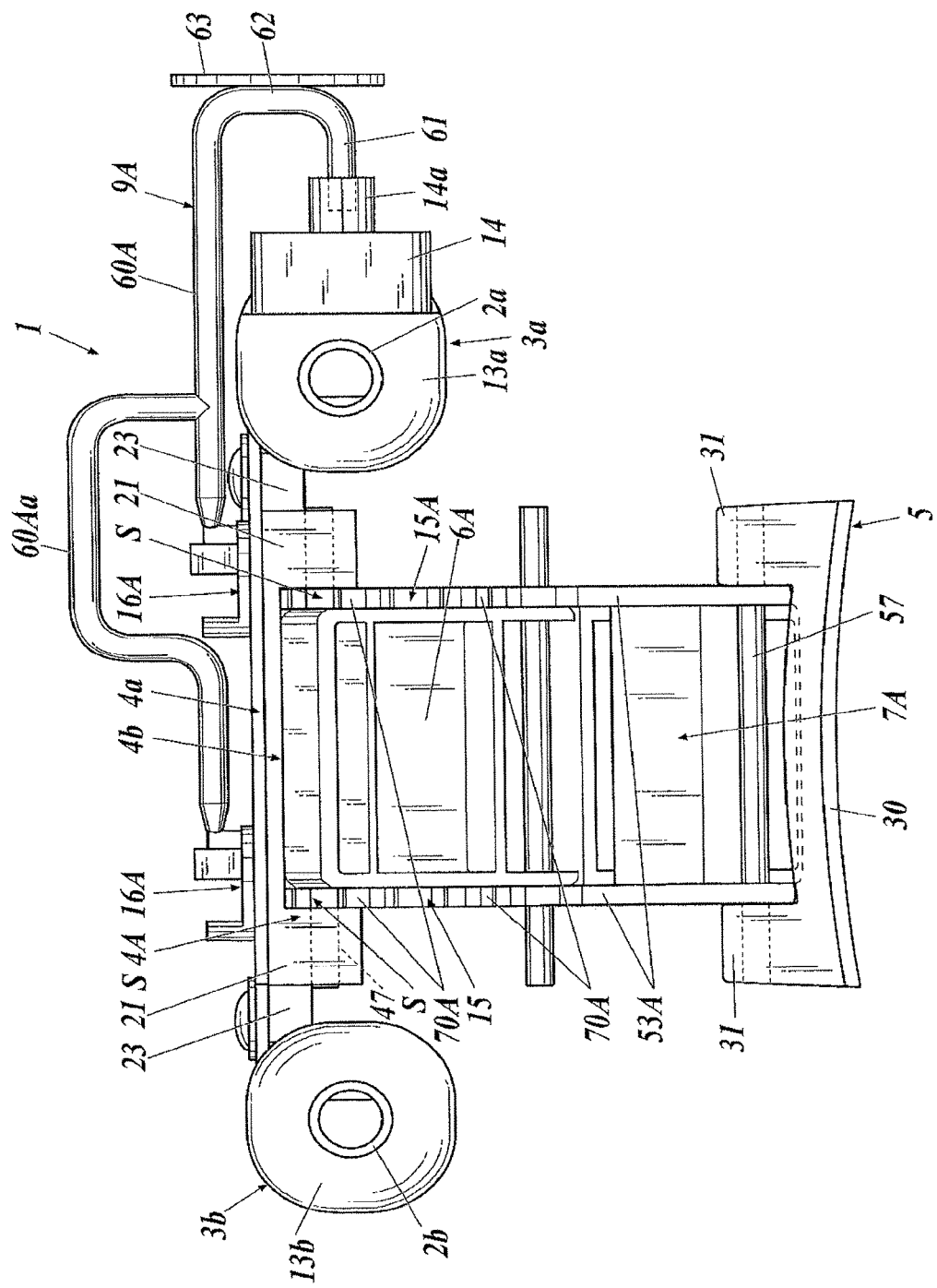
FIG. 12 is a plan view of a front-rear locking mechanism according to a modification.
Figure 13:
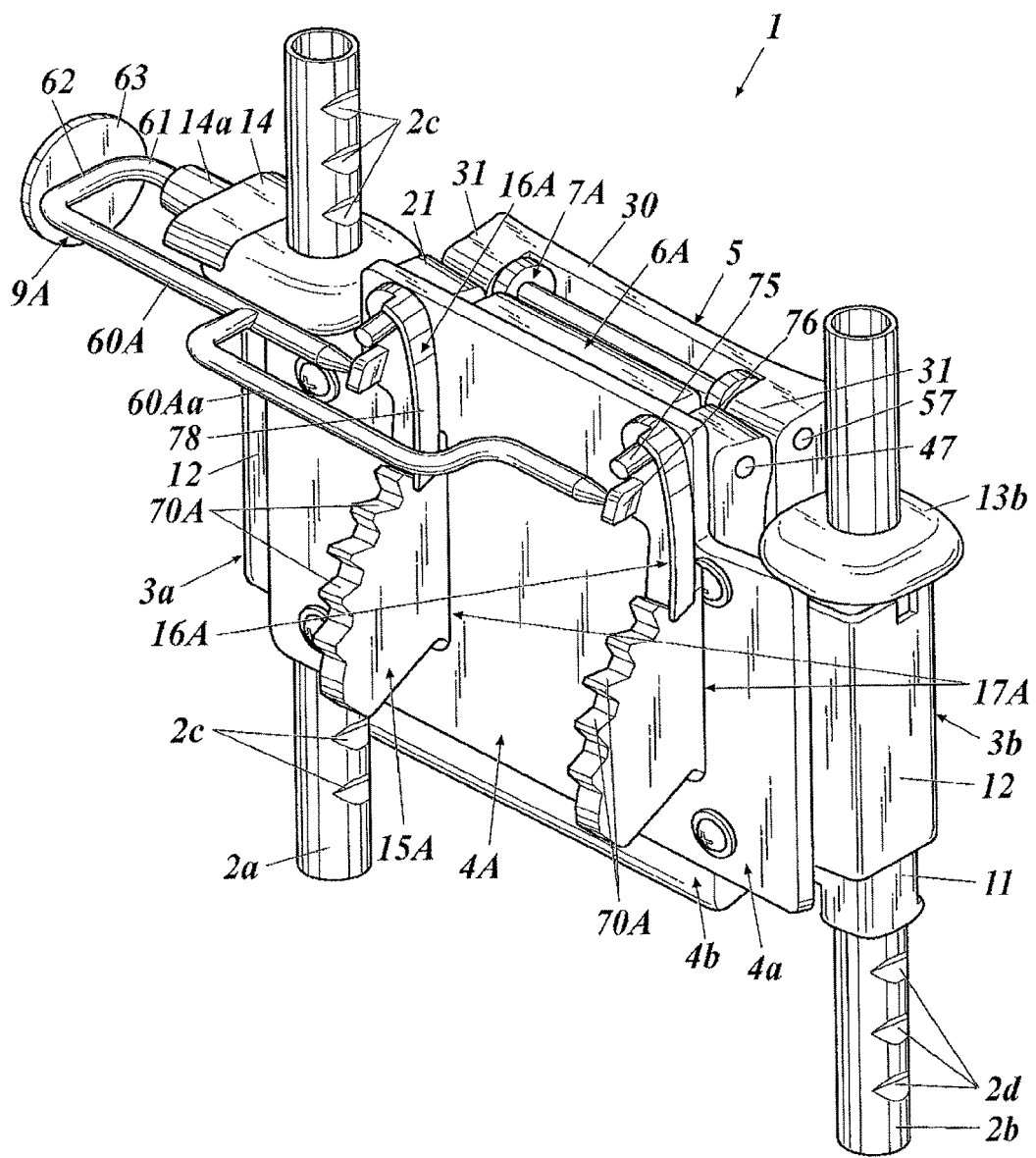
FIG. 13 is a rear perspective view of a front-rear locking mechanism according to the modification.

The lock receiver 15 is disposed in the center between the first and second headrest pillars 2a and 2b according to the above embodiments. Alternatively, multiple lock receivers may be disposed in right and left portions relative to the center between the first and second headrest pillars 2a and 2b, as illustrated in FIGS. 12 and 13. The multiple lock receivers disposed in the right and left portions are hereinafter referred to as "lock receivers 15A."

If such multiple lock receivers are provided, the inside linkage segment 6 does not need to receive the lock receiver 15 at the center and thus does not necessarily include the first arm 40 and the second arm 41. According to the modification, the inside linkage segment 6 is replaced with a wide single-arm inside linkage segment 6A having a width substantially equal to the sum of the widths of the first arm 40 and the second arm 41 and the width of the space between the arms 40 and 41.

The outside linkage segment 7 also does not need to be provided with the lock receiver 15 at the center. The outside linkage segment 7 is thus replaced with a wide single-arm outside linkage segment 7A having a width substantially equal to the sum of the widths of the first arm 50 and the second arm 51.

The lock receivers 15A each have a thickness in the right-left direction substantially half the thickness of the lock receiver 15.

The lock receivers 15A are respectively disposed in right and left spaces S defined by the stationary unit 4 and the X linkage in the right-left direction. The spaces S each have a width in the right-left direction substantially equal to the thickness of right and left side walls 53A provided to the right and left lateral edges, respectively, of the outside linkage segment 7A.

The lock receivers 15A are integrated with the respective rear ends of the right and left side walls 53A of the outside linkage segment 7A.

The lock receivers 15A each have the same shape as that of the lock receiver 15 as viewed from the side. In other words, the lock receivers 15A each include multiple teeth 70A.

A stationary unit 4A according to the modification has multiple clearances 17A corresponding to the respective lock receivers 15A. Each of the clearances 17A is a through hole extending through the stationary unit 4, like the clearance 17.

The stationary unit 4A is further provided with multiple locking components 16A above the respective clearances 17A such that the locking components 16A can swing in the right-left direction. In other words, the locking components 16A correspond to the respective lock receivers 15A.

A operation unit 9A according to the modification includes a first shaft segment 60A to operate one of the locking components 16A provided in the left portion. The first shaft segment 60A is shorter than the first shaft segment 60.

The operation unit 9A further includes an extension shaft segment 60Aa to operate the other locking component 16A provided in the right portion. The extension shaft segment 60Aa bends in the vicinity of the tip of the first shaft segment 60A to avoid the left locking component 16A. The tip of the extension shaft segment 60Aa abuts on the right locking component 16A.

The operation unit 9A can thus simultaneously operate the locking components 16A and thus can simultaneously disengage the locking components 16A from the lock receivers 15A. In other words, the operation unit 9A can efficiently unlock the multiple separate locking mechanisms in the right and left portions relative to the center between the first and second headrest pillars 2a and 2b through a single operation.

The front-rear locking mechanism according to the modification, which includes the lock receivers 15A disposed in the right and left portions relative to the center between the first and second headrest pillars 2a and 2b, can achieve a balanced locking or unlocking operation over multiple positions in the width direction of the headrest 1. This modification can satisfy the requirement for a balanced locking or unlocking operation of the front-rear locking mechanism over multiple positions in the width direction of the headrest 1.

Furthermore, the X linkage disposed between the lock receivers 15A can be centered and rotate smoothly.

In addition, the lock receivers 15A are disposed in the spaces S defined by the stationary unit 4A and the X linkage and thus such configuration can contribute the production of a compact headrest 1 without being blocked by the lock receivers 15A.

Modification 4

Figure 14:
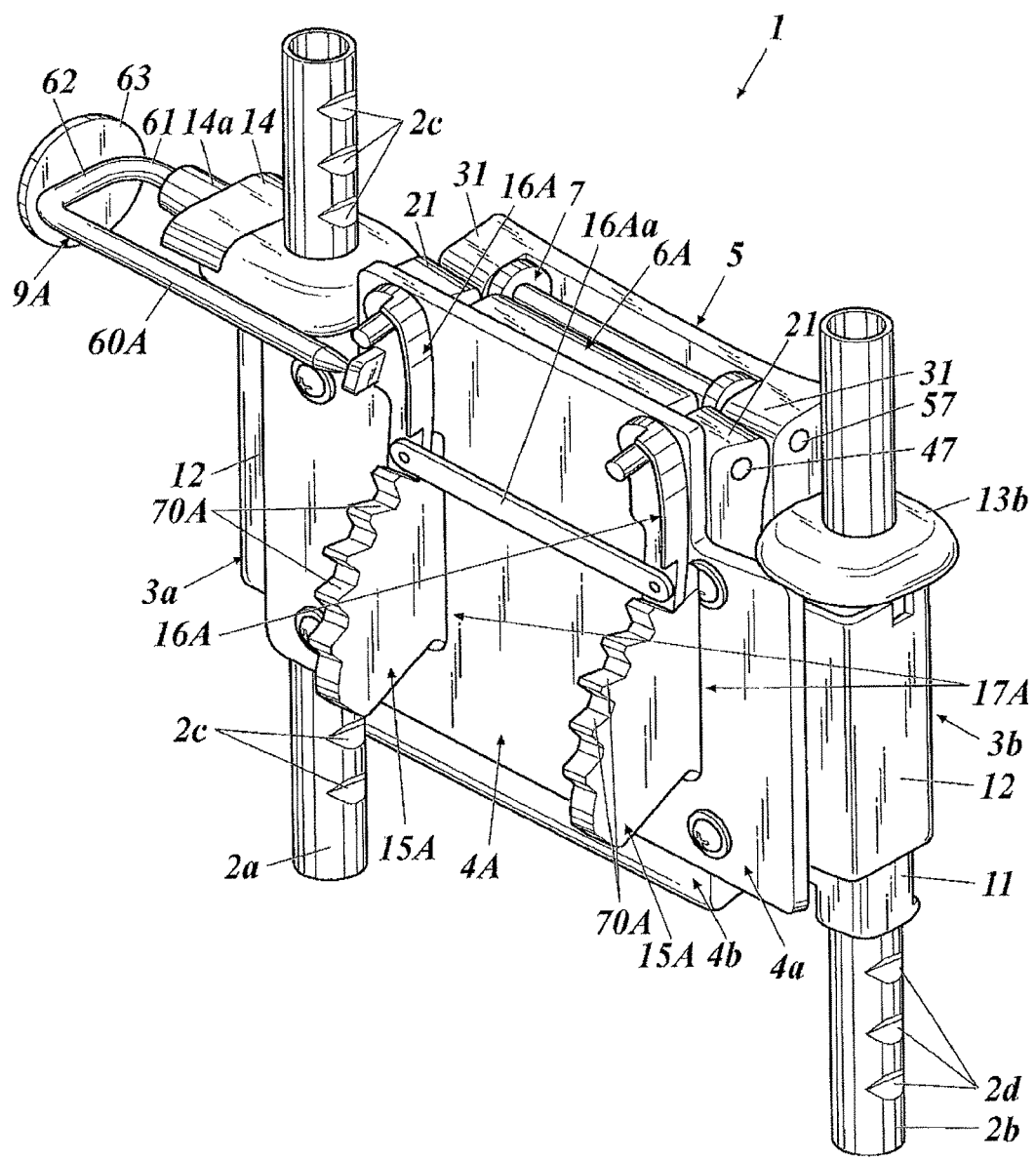
FIG. 14 is a rear perspective view of a front-rear locking mechanism according to another modification.

The operation unit 9A includes the extension shaft segment 60Aa according to Modification 3. Alternatively, the locking components 16A may be coupled to each other with a coupler 16Aa such that the locking components 16A move in synchronization, as illustrated in FIG. 14.

The coupler 16Aa can function as a link rotatably coupling the locking components 16A.

The locking components 16A are coupled to each other with the coupler 16Aa; hence, an operation of the first shaft segment 60A of the operation unit 9A on one of the locking components 16A can simultaneously disengage all the locking components 16A from the lock receivers 15A. In other words, the operation unit 9A can efficiently unlock the multiple separate locking mechanisms in the right and left portions relative to the center between the first and second headrest pillars 2a and 2b through a single operation.

This modification can satisfy the requirement for a single efficient unlocking operation of the multiple separate locking mechanisms in the right and left portions relative to the center between the first and second headrest pillars 2a and 2b.

Modification 5

Figure 15:
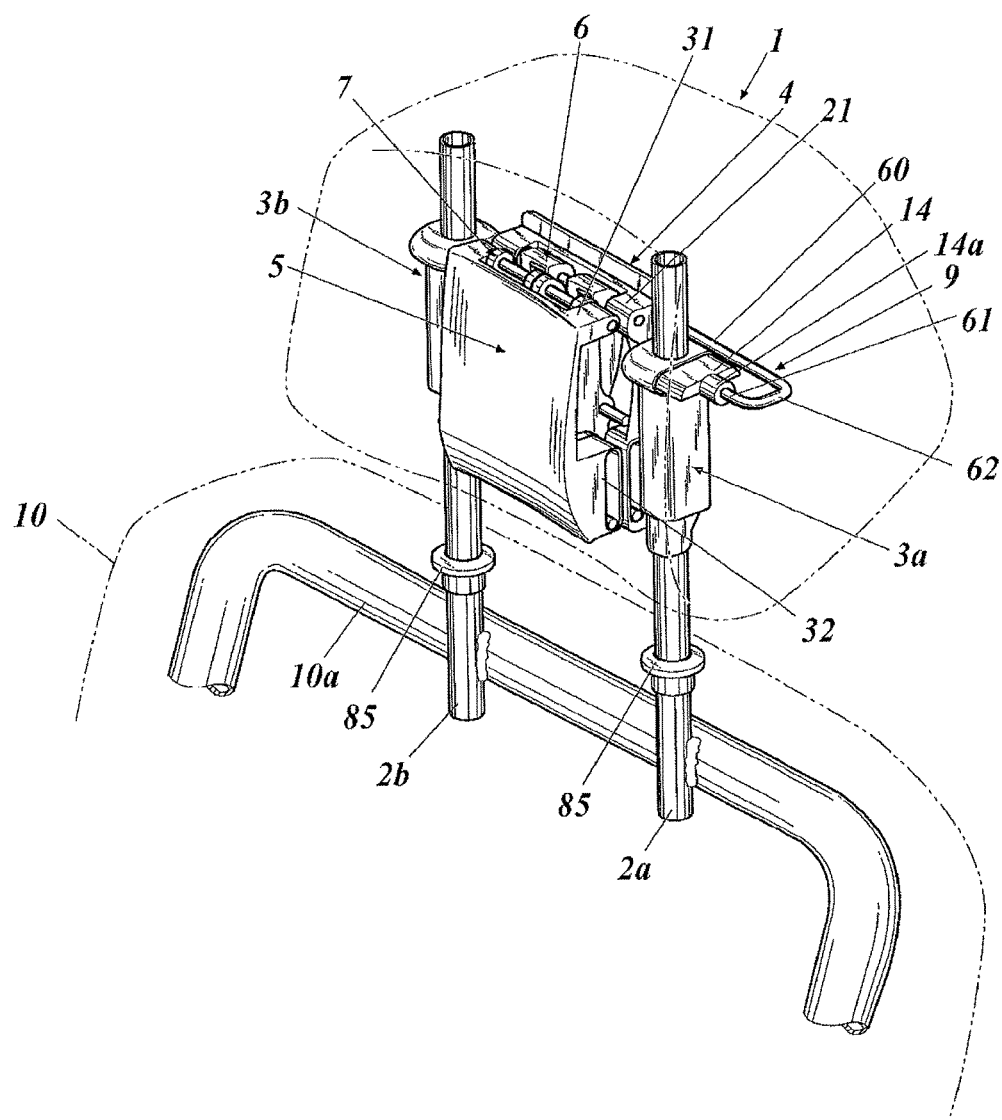
FIG. 15 is a perspective view illustrating a mode of mounting a headrest to a seat back according to a modification.

The headrest 1 is mounted to the seat back frame 10a via the holders 80 for holding lower portions of the first and second headrest pillars 2a and 2b according to the above embodiments. Alternatively, the lower portions of the first and second headrest pillars 2a and 2b may be directly fixed to the upper end of the seat back frame 10a, as illustrated in FIG. 15. According to the modification, the lower portions of the first and second headrest pillars 2a and 2b are welded to the upper end of the seat back frame 10a.

The top end of the seat back 10 receives the first and second headrest pillars 2a and 2b and is equipped with decorative sleeve caps 85 for decorating the respective boundaries between the seat back 10 and the first and second headrest pillars 2a and 2b. In other words, the flanges of the caps 85 are exposed from the top end of the seat back 10.

The direct fixation of the lower portions of the first and second headrest pillars 2a and 2b to the upper end of the seat back frame 10a can securely mount the headrest 1 to the seat back 10.

This modification can satisfy the requirement for the secure mounting of the headrest 1 to the seat back 10.

According to the above embodiments, the X linkage allows the movable unit 5 to move apart from or close to the stationary unit 4 toward the front or rear direction. The front-rear locking mechanism can lock or unlock the movable unit 5 movable forward or rearward relative to the stationary unit 4, to shift the movable unit 5 adjustably to multiple positions in the front-rear direction. The movable unit 5 can thus move in the front-rear direction to a proper position relative to the head of an occupant and remain at the position in a normal mode. This configuration can provide high seating comfort.

The lock receiver 15 integrated with the outside linkage segment 7 can rotate in conjunction with the outside linkage segment 7. In other words, the X linkage and the front-rear locking mechanism can move together. The movable unit 5 can thus be readily shifted in the front-rear direction.

This configuration can satisfy the requirement for the ready adjustment of the position of the movable unit 5 in the front-rear direction through the association of the movement of the X linkage and the front-rear locking mechanism.

The lock receiver 15 includes a ratchet mechanism having multiple teeth 70; hence, the movable unit 5 can be shifted to multiple positions corresponding to the respective teeth 70 in the front-rear direction. In addition, the teeth 70 of the lock receiver 15 are arranged on an arc line corresponding to the rotation of the X linkage, so that the front-rear movement of the movable unit 5 by the X linkage can be readily associated with the locking or unlocking of the movable unit 5 by the front-rear locking mechanism.

This configuration can satisfy the requirement for the ready association of the front-rear movement of the movable unit 5 by the X linkage with the locking or unlocking of the movable unit 5 by the front-rear locking mechanism.

The front-rear locking mechanism, which includes the lock receiver 15 disposed in the center between the first and second headrest pillars 2a and 2b, can achieve a balanced locking or unlocking operation in the center in the width direction of the headrest 1. In addition, the X linkage disposed symmetrically to the lock receiver 15 can rotate smoothly.

This configuration can satisfy the requirement for the smooth rotation of the X linkage.

The stationary unit 4 is provided with the clearance 17 in the position corresponding to that of the lock receiver 15; hence, the lock receiver 15 can protrude rearward from the stationary unit 4 through the clearance 17 for receiving the lock receiver 15, in response to the rearward movement of the movable unit 5. This configuration can prevent the stationary unit 4 from blocking the rotation of the lock receiver 15 for protruding rearward from the stationary unit 4.

This configuration can satisfy the requirement for the prevention of the stationary unit 4 from blocking the rotation of the lock receiver 15.

INDUSTRIAL APPLICABILITY

The claimed headrest can be applied to a seat installed in a vehicle.

REFERENCE SIGNS LIST

1 headrest
2a first headrest pillar
2b second headrest pillar
3a pillar retainer
3b pillar retainer
4 stationary unit
5 movable unit
6 inside linkage segment
7 outside linkage segment
8 connecting intersection
9 operation unit
10 seat back
10a seat back frame
14 locking unit
15 lock receiver
16 locking component
17 clearance
21 support
22 support
22a elongated opening
30 recessed portion
31 support
32 support
32a elongated opening
33 headrest casing
40 first arm
41 second arm
42 connection
50 first arm
51 second arm
52 connection
60 first shaft segment
61 second shaft segment
62 connecting shaft segment
70 tooth

The invention claimed is:
1. A headrest comprising:
first and second headrest pillars;
a stationary unit disposed between the first and second headrest pillars;
a movable unit movable with respect to the stationary unit toward a front or rear direction;
a movable mechanism connected to the movable unit; and
a front-rear locking mechanism comprising lock receivers and locking components engageable with the lock receivers, the locking mechanism being configured to lock or unlock the movable unit movable relative to the stationary unit toward the front or rear direction;
wherein
the lock receivers protrude rearward from the stationary unit in response to the movement of the movable unit toward the rear direction,
the stationary unit has clearances to receive the lock receivers,
the movable mechanism comprises a linkage segment which connects the lock receivers, and
the linkage segment is disposed in front of the stationary unit.

2. The headrest according to claim 1, wherein
the lock receivers consist of a first lock receiver and a second lock receiver respectively disposed on left and right sides of the headrest, and
the lock receivers and the linkage segment are integrated with each other.

3. The headrest according to claim 1, wherein
the lock receivers consist of a first lock receiver and a second lock receiver respectively disposed on left and right sides of the headrest, and
the lock receivers extend forward, and the linkage segment connects the lock receivers at portions near front ends of the lock receivers.

4. The headrest according to claim 3, wherein the linkage segment is shorter than a distance between an outer edge of the first lock receiver and an outer edge of the second lock receiver.

5. The headrest according to claim 3, wherein
the clearances consist of a first clearance and a second clearance respectively disposed on left and right sides of the headrest to receive the first and second lock receivers, and
the linkage segment is shorter than a distance between an outer edge of the first clearance and an outer edge of the second clearance.

6. The headrest according to claim 1, wherein an upper edge of the locking component is disposed above upper edges of the lock receivers.

7. The headrest according to claim 1, wherein the stationary unit comprises a rib.

8. The headrest according to claim 7, wherein the rib protrudes forward.

9. A vehicle seat comprising:
first and second headrest pillars;
a stationary unit disposed between the first and second headrest pillars;
a movable unit movable with respect to the stationary unit toward a front or rear direction;
a movable mechanism connected to the movable unit; and
a front-rear locking mechanism comprising lock receivers and locking components engageable with the lock receivers, the locking mechanism being configured to lock or unlock the movable unit movable relative to the stationary unit toward the front or rear direction;
an operation unit to operate the locking components; and
a seat back frame that constitutes a frame of the vehicle seat, wherein
the lock receivers protrude rearward from the stationary unit in response to the movement of the movable unit toward the rear direction,
the lock receivers consist of a first lock receiver and a second lock receiver that are respectively disposed on left and right sides of the headrest,
the stationary unit has clearances to receive the lock receivers,
the movable mechanism comprises a linkage segment integrated with the lock receivers to connect the lock receivers,
the front-rear locking mechanism comprises pillar retainers that are slidable respectively along the first and the second headrest pillars,
the movable unit comprises a headrest casing that houses upper portions of the first and second headrest pillars, the stationary unit, the movable mechanism and the front-rear locking mechanism, and
the movable unit further comprises a cushion pad and a covering material that are disposed around the headrest casing.

10. The vehicle seat according to claim 9, wherein the movable unit comprises a recessed portion on a front side of the movable unit.

* * * * *